(12) United States Patent
Nam

(10) Patent No.: US 12,499,354 B2
(45) Date of Patent: Dec. 16, 2025

(54) ACCELERATING DEVICE, DATA PROCESSING SYSTEM AND OPERATING METHOD OF ACCELERATING DEVICE FOR PERFORMING CALCULATION BASED ON BATCH SIZE AND SEQUENCE SIZE

(71) Applicant: SK hynix Inc., Icheon-si (KR)

(72) Inventor: Ji Hoon Nam, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 875 days.

(21) Appl. No.: 17/161,658

(22) Filed: Jan. 28, 2021

(65) Prior Publication Data

US 2022/0067494 A1    Mar. 3, 2022

(30) Foreign Application Priority Data

Aug. 27, 2020  (KR) .......................... 10-2020-0108437

(51) Int. Cl.
*G06F 15/80* (2006.01)
*G06F 9/50* (2006.01)
*G06N 3/063* (2023.01)

(52) U.S. Cl.
CPC ........... *G06N 3/063* (2013.01); *G06F 9/5027* (2013.01); *G06F 15/80* (2013.01)

(58) Field of Classification Search
CPC ............................... G06F 15/80; G06N 3/063
See application file for complete search history.

(56) References Cited

U.S. PATENT DOCUMENTS

| 10,740,432 | B1 * | 8/2020 | Diamant | G06N 3/045 |
| 11,157,794 | B2 * | 10/2021 | Woo | G06N 3/10 |
| 11,227,216 | B2 * | 1/2022 | Young | G06N 3/063 |
| 2019/0042925 | A1 * | 2/2019 | Choe | G06N 3/063 |
| 2019/0236049 | A1 * | 8/2019 | Vantrease | G06F 17/16 |

(Continued)

FOREIGN PATENT DOCUMENTS

| CN | 107454965 A | 12/2017 |
| CN | 107578098 A | 1/2018 |

(Continued)

OTHER PUBLICATIONS

Notice of Office Action for TW Appl. No. 110119254, mailed on Nov. 14, 2024, 13 pages.

(Continued)

*Primary Examiner* — Jacob Petranek
(74) *Attorney, Agent, or Firm* — Perkins Coie LLP

(57) ABSTRACT

Accelerating devices, data storing devices, data processing systems and operating methods of accelerating devices are disclosed. In one aspect, an accelerating device includes an accelerator. The accelerator processes a calculation by using a calculation method selected based on at least one of a batch size and a sequence size and by controlling an input path of first input data and second input data to the processing element array according to the selected calculation method. The calculation method includes a first calculation method and a second calculation method, and the first input data and the second input data are input to the processing element array based on the batch size according to the first calculation method and the first input data being input to the processing element array based on the sequence size according to the second calculation method.

16 Claims, 15 Drawing Sheets

(56) References Cited

U.S. PATENT DOCUMENTS

| | | | |
|---|---|---|---|
| 2020/0026980 A1 | 1/2020 | Ovsiannikov et al. | |
| 2020/0167636 A1* | 5/2020 | Kwak | G06N 3/063 |
| 2020/0349216 A1* | 11/2020 | Das Sarma | G06F 9/30036 |
| 2025/0028945 A1* | 1/2025 | Sather | G06N 3/0464 |

FOREIGN PATENT DOCUMENTS

| | | | |
|---|---|---|---|
| KR | 1020170133364 A | 12/2017 | |
| KR | 1020190065144 A | 6/2019 | |
| KR | 1020200011019 A | 1/2020 | |
| KR | 1020210006120 A | 1/2021 | |
| TW | 202020856 A | 6/2020 | |
| TW | 202026858 A | 7/2020 | |
| TW | 202029066 A | 8/2020 | |
| WO | 2018171899 A1 | 9/2018 | |

OTHER PUBLICATIONS

Request for the Submission of an Opinion for KR Appl. No. 10-2020-0108437, mailed on Oct. 21, 2024, 30 pages with English translation.

Challapalle N. et al., "PSB-RNN: A Processing-in-Memory Systolic Array Architecture using Block Circulant Matrices for Recurrent Neural Networks," 2020 Design, Automation and Test in Europe (Date 2020) Conference & Exhibition, Mar. 9, 2020, pp. 180-185.

Request for the Submission of an Opinion for KR Appl. No. 10-2020-0108437, mailed on Jun. 23, 2025, 25 pages with English translation.

* cited by examiner

ACCELERATING DEVICE, DATA PROCESSING SYSTEM AND OPERATING METHOD OF ACCELERATING DEVICE FOR PERFORMING CALCULATION BASED ON BATCH SIZE AND SEQUENCE SIZE

CROSS-REFERENCES TO RELATED APPLICATION

This patent document claims the priority and benefits of Korean application number 10-2020-0108437, filed on Aug. 27, 2020, which is incorporated herein by reference in its entirety as part of the disclosure of this patent document.

TECHNICAL FIELD

The technology and implementations disclosed in this patent document generally relate to a semiconductor device.

BACKGROUND

An artificial intelligence (AI) accelerator is a type of hardware accelerator or computer system designed to accelerate artificial intelligence applications, such as artificial neural networks. The AI accelerator can speed up processes associated with artificial intelligence applications, such as multi-layer perceptron (MLP), long short-term memory (LSTM), convolutional neural network (CNN) while reducing the burden on host resources.

Long short-term memory (LSTM) is an artificial recurrent neural network architecture used in the field of deep learning, and calculations associated with LSTM operations may be performed through calculations of sequence-information-based input data and an output value of a current cell in an accelerator.

As speed improvement of the above described calculation is directly connected to the performance of the accelerator, various techniques, including new ways to speed up processes within the accelerator is being discussed.

SUMMARY

The technology disclosed in this patent document can be implemented in various embodiments to provide an accelerating device with an improved capability of a calculation on input data, data storing device, data processing system and operating method of an accelerating device.

In an embodiment, an accelerating device may include an accelerator in communication with a processing element array of an artificial neural network and configured to perform a calculation by using a calculation method selected based on at least one of a batch size corresponding to a size of data concurrently processable by the processing element array and a sequence size corresponding to a length of data sequentially input to the processing element array and by controlling an input path of first input data and second input data to the processing element array according to the selected calculation method, wherein the calculation method includes a first calculation method and a second calculation method, and the first input data and the second input data are input to the processing element array based on the batch size according to the first calculation method and the first input data being input to the processing element array based on the sequence size according to the second calculation method.

In an embodiment, a data storing device may include: a processing element array configured to perform calculations associated with input data; and an accelerator in communication with the processing element array and configured to perform a calculation by using a calculation method selected based on at least one of a batch size corresponding to a size of data concurrently processable by the processing element array and a sequence size corresponding to a length of data sequentially input to the processing element array and by controlling an input path of first input data and second input data to the processing element array according to the selected calculation method, wherein the calculation method includes a first calculation method and a second calculation method, and the first input data and the second input data are input to the processing element array based on the batch size according to the first calculation method and the first input data being input to the processing element array based on the sequence size according to the second calculation method.

In an embodiment, a data processing system may include a host device and a data storing device. The host device may determine a calculation method and a method of inputting first input data and second input data to a processing element array based on at least one of a comparison between a batch size and a batch reference value, a comparison between a sequence size and a sequence reference value, or a combination of the comparisons; and a data storing device configured to control an input path of the first input data and the second input data to the processing element array according to the determined calculation method, wherein the calculation method includes a first calculation method and a second calculation method, and the first input data and the second input data are input to the processing element array based on the batch size according to the first calculation method and the first input data being input to the processing element array based on the sequence size according to the second calculation method.

In an embodiment, an operating method of an accelerating device may include receiving a batch size corresponding to a size of data concurrently processable and a sequence size corresponding to a length of data sequentially input; selecting one between a first calculation method and a second calculation method as a calculation method and selecting a method of inputting first input data and second input data to a processing element array based on at least one of a comparison between the batch size and a batch reference value, a comparison between the sequence size and a sequence reference value, or a combination of the comparisons; inputting, upon determination that the calculation method is the first calculation method, the first input data or the second input data corresponding to the batch size, to the processing element array in a first direction; inputting, upon determination that the calculation method is the second calculation method, the first input data corresponding to the sequence size, to the processing element array in the first direction; and performing a calculation process by utilizing the first input data, the second input data and weight values respectively for the first input data and the second input data and then obtaining a state value of a current cell and an output value of the current cell.

In an embodiment, an accelerating device may include a processing element array including a plurality of processing elements and configured to output a first calculation result value, a second calculation result value and a third calculation result value, the first calculation result value being a result of a calculation on first input data and third input data corresponding to a weight value of the first input data, and the second calculation result value being a result of a calculation on second input data and fourth input data corresponding to a weight value of the second input data; an IO buffer block configured to provide the first input data and the second input data to the processing element array in a first direction; a weight buffer block configured to provide the third input data and the fourth input data to the processing element array in a second direction; and a processing element controller configured to select one between a first calculation method and a second calculation method as a calculation method and select a method of inputting the first input data and the second input data to the processing element array based on at least one of a comparison between a batch size and a batch reference value, a comparison between a sequence length and a sequence reference value, or a combination of the comparisons, wherein the first input data and the second input data are input to the processing element array based on the batch size according to the first calculation method and the first input data is input to the processing element array based on the sequence size according to the second calculation method.

In an embodiment, an accelerating device may include an accelerator. The accelerator may process a calculation by determining a calculation method based on at least one or more between a batch size and a sequence size and by controlling an input path of first input data and second input data to a Processing Element (PE) array according to the determined calculation method. The calculation method may include a first calculation method and a second calculation method, the first input data and the second input data being input to the PE array based on the batch size according to the first calculation method and the first input data being input to the PE array based on the sequence size according to the second calculation method.

In an embodiment, a data storing device may include an accelerator. The accelerator may process a calculation by determining a calculation method based on at least one or more between a batch size and a sequence size and by controlling an input path of first input data and second input data to a Processing Element (PE) array according to the determined calculation method. The calculation method may include a first calculation method and a second calculation method, the first input data and the second input data being input to the PE array based on the batch size according to the first calculation method and the first input data being input to the PE array based on the sequence size according to the second calculation method.

In an embodiment, a data processing system may include a host device and a data storing device. The host device may determine a calculation method including a method of inputting first input data and second input data to a Processing Element (PE) array based on at least one or more among a result value of comparing a batch size with a batch reference value, a result value of comparing a sequence size with a sequence reference value and a combination of the result values. The data storing device may control an input path of the first input data and the second input data to the PE array according to the determined calculation method. The calculation method may include a first calculation method and a second calculation method, the first input data and the second input data being input to the PE array based on the batch size according to the first calculation method and the first input data being input to the PE array based on the sequence size according to the second calculation method.

In an embodiment, an operating method of an accelerating device may include receiving a batch size and a sequence size; determining one between a first calculation method and a second calculation method as a calculation method including a method of inputting first input data and second input data to a Processing Element (PE) array based on at least one or more among a result value of comparing the batch size with a batch reference value, a result value of comparing the sequence size with a sequence reference value and a combination of the result values; inputting, if the first calculation method is determined as the calculation method, the first input data or the second input data, within which a number of data pieces corresponds to the batch size, to the PE array in a first direction; inputting, if the second calculation method is determined as the calculation method, the first input data, within which a number of data pieces corresponds to the sequence size, to the PE array in the first direction; and performing a calculation process by utilizing the first input data, the second input data and weight values respectively for the first input data and the second input data and then obtaining a state value of a current cell and an output value of the current cell.

In an embodiment, a data storing device may include a Processing Element (PE) array, an IO buffer block, a weight buffer block and a PE controller. The PE array may include a plurality of PEs and may output a first calculation result value, a second calculation result value and a third calculation result value, the first calculation result value being a result of a calculation on first input data and third input data, which is a weight value of the first input data, and the second calculation result value being a result of a calculation on second input data and fourth input data, which is a weight value of the second input data. The IO buffer block may provide the first input data and the second input data to the PE array in a first direction. The weight buffer block may provide the third input data and the fourth input data to the PE array in a second direction. The PE controller may control overall operations as well as an operation of determining one between a first calculation method and a second calculation method as a calculation method including a method of inputting the first input data and the second input data to the PE array based on at least one or more among a result value of comparing a batch size with a batch reference value, a result value of comparing a sequence size with a sequence reference value and a combination of the result values. The first input data and the second input data may be input to the PE array based on the batch size according to the first calculation method and the first input data may be input to the PE array based on the sequence size according to the second calculation method.

In some implementations of the disclosed technology, a calculation method may be determined on the basis of a batch size and a sequence size of data to be input and data input may be adjusted and a calculation may be processed depending on the determined calculation method. Therefore, expected may be an effect that efficiency of a calculation on input data may be improved.

In some implementations of the disclosed technology, data input may be processed in parallel with reference to a sequence. Therefore, expected may be an effect that a speed of a calculation on data may be improved.

DETAILED DESCRIPTION

Figure 1:
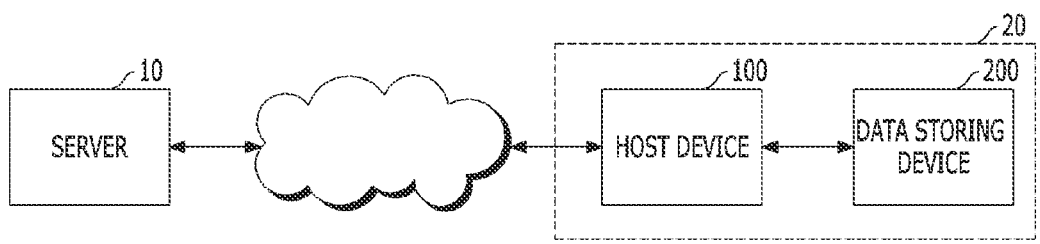
FIG. 1 is a diagram illustrating an example of an external server and a data processing system in communication with the external server based on based on some implementations of the disclosed technology.
Figure 2:
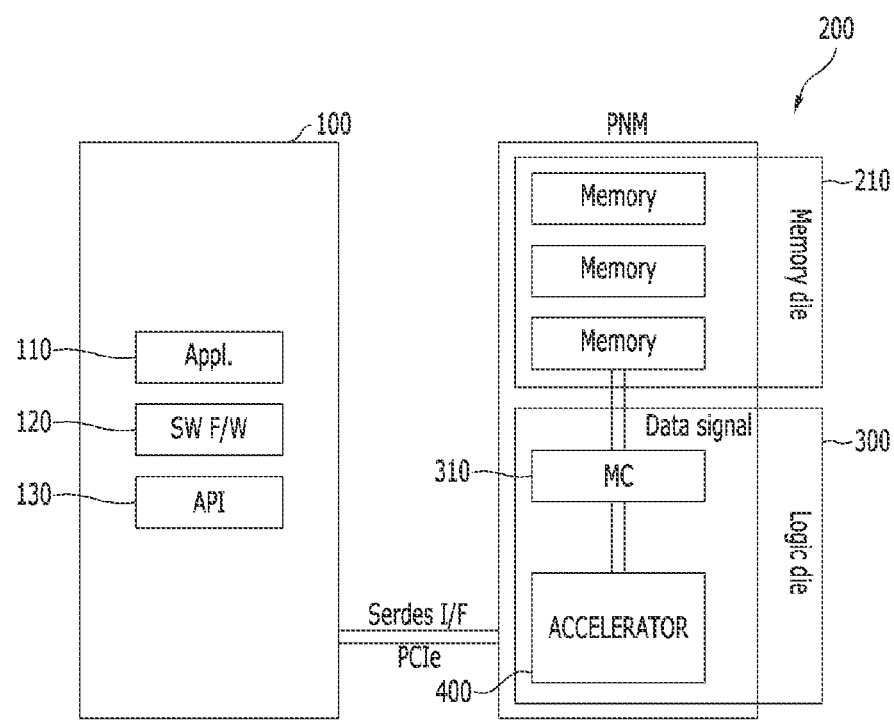
FIG. 2 is a diagram illustrating an example of a data processing system based on some implementations of the disclosed technology.

The technology disclosed in this patent document can be implemented in various embodiments to speed up processes associated with artificial intelligence applications such as long short-term memory (LSTM). FIG. 1 is a diagram illustrating a connection relationship between an external server and a data processing system based on some implementations of the disclosed technology. FIG. 2 is a diagram illustrating a configuration of a data processing system based on some implementations of the disclosed technology.

Referring to FIG. 1, the data processing system 20 may be coupled to an external server 10 through a communication network to receive data. The data may be of the batch size and the sequence size or sequence length, which will be described later. A deep learning algorithm/artificial neural network algorithm may process a "batch" of data concurrently.

In some implementations, batch size can indicate the number of training samples utilized in one iteration. For instance, if the batch size is set to 100 samples, the algorithm takes 100 samples from the training dataset and trains the network. In some implementations, the batch size can indicate the size of dataset the data processing system 20 can process at a time. Since the data processing system 20 cannot process the entire dataset at once, it divides the dataset into a plurality of batches and processes one batch at a time. For example, when a first input data is picture image, a number of the picture images that can be processed at once may be the batch size of the first input data. For example, provided that the batch size is ten (10), the first input data may include ten picture images. For example, the multiplication and accumulation (MAC) calculation may be performed on the ten picture images of the first input data based on weights of the first input data. Here, the weights may indicate the number of picture images in the first input data.

The greater the batch size of the first input data within a range a processing element (PE) array can handle, the greater the utilization of the MAC. If the batch size of the first input data is too small for the range the PE array can handle, the resources of the MAC would be wasted. Therefore, the disclosed technology can be implemented in some embodiments to improve a processing speed of calculation by performing calculations in parallel on the first input data that is input to the PE array when the batch size of the first input data is small or not the same as the batch size the PE array can handle.

In some implementations, sequence size or sequence length may indicate the length of data that is sequentially fed to the deep learning algorithm. In some implementations, a sequence may include time base data of the same batch. A batch may be a set of data that can be processed concurrently by the data storing device 200 (or an accelerator 400 as described later). A sequence size may be the length of the data that is sequentially input to the data storing device 200 (or the accelerator 400).

For example, in a case of the natural language processing (NLP) mainly utilizing the LSTM, a number of sentences may be a batch size and a length of each sentence may be a sequence size. For example, in a sentence "Can I help you," a batch size may be one (1) and a sequence size may be four (4). For example, in a sentence "It is beautiful," a batch size may be one (1) and a sequence size may be three (3).

The data processing system 20 may include a host device 100 and a data storing device 200.

Referring to FIG. 2, the host device 100 may include an application 110, a software firmware 120 and an application programming interface 130.

The software firmware 120 of the host device 100 may determine a calculation method within the accelerator 400 based on at least one or more between the batch size and the sequence size. The calculation method may be determined by the data storing device 200 as well as the host device 100.

Although not illustrated, the host device 100 may perform a compiling operation based on network model information including hardware architecture information such as Network Information and Processing Near Memory (PNM) Architecture Information. Here, the host device 100 may perform a compiling operation for a Processing Near Memory (PNM).

According to the above described PNM, a data signal is coupled to a logic die 300. Therefore, the PNM may cause a higher speed than the data pin structure of the High Bandwidth Memory (HBM). This is because a speed limit for an off-chip connection is removed.

The network may include the Convolutional Neural Network (CNN), the Multi-Layer Perceptron (MLP), the Long Short Term Memory (LSTM) and so forth. As described above, the network may be a neural network and is not limited thereto.

Referring to FIG. 2, the data storing device 200 may include a memory controller 310, the accelerator 400 and a plurality of memory dies 210. The memory controller 310 and the accelerator 400 may be included in the logic die 300. The data storing device 200 may be a Processing Near Memory (PNM).

The data storing device 200 may communicate with the host device 100 through the Serdes Interface protocol. Not limited thereto, the data storing device 200 may support any protocol capable of communicating with the host device 100 as well as protocols such as the peripheral component interconnect express (PCI-E), the universal serial bus (USB), the universal flash storage (UFS), the multimedia card (MMC), the parallel advanced technology attachment (PATA), the serial advanced technology attachment (SATA), the small computer system interface (SCSI), the serial attached SCSI (SAS) and the peripheral component interconnection (PCI).

Figure 3:
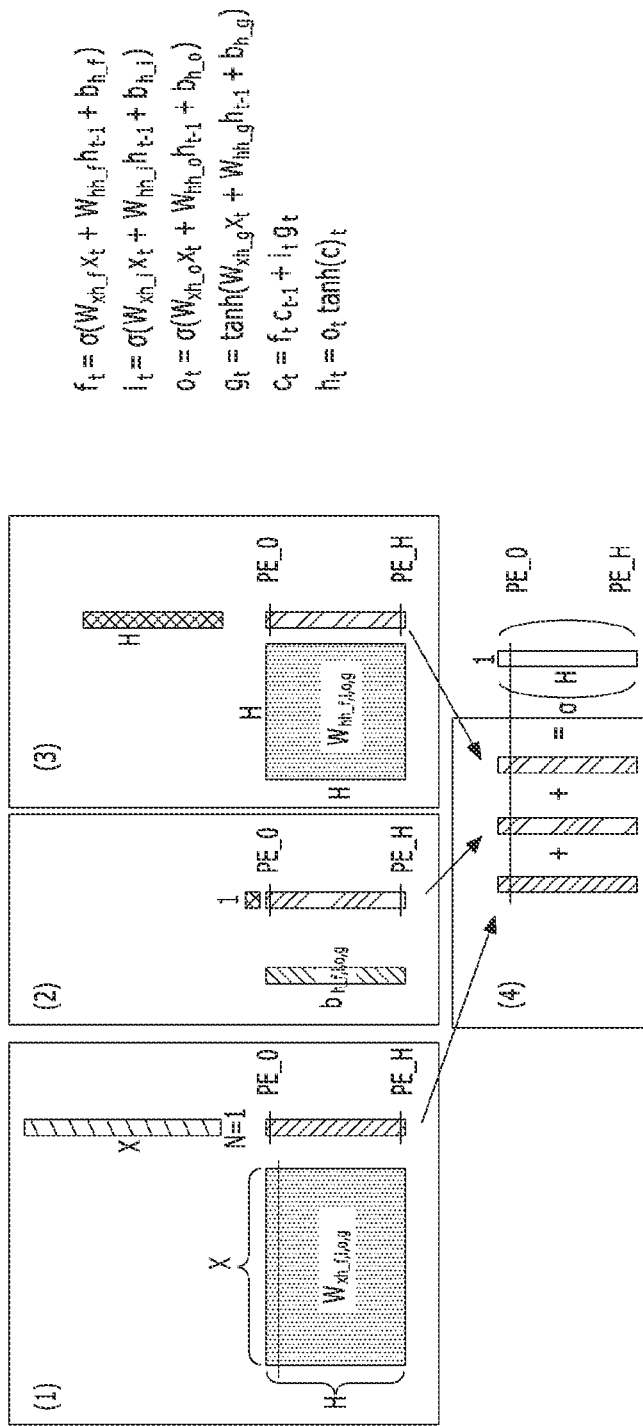
FIG. 3 is a diagram illustrating a calculation method based on some implementations of the disclosed technology.

FIG. 3 is a diagram sketchily illustrating a calculation method based on some implementations of the disclosed technology.

The data storing device 200 illustrated in FIG. 2 may determine by itself a calculation method based on at least one or more among a calculation method provided from the host device 100 and the batch size and the sequence size provided from the host device 100.

In an embodiment, the data storing device 200 may separately perform calculation on an input value 'xt', which is an input value of a current cell, calculation on an output value 'ht−1', which is an output value of a previous cell and bias calculation. Then, the data storing device 200 may perform addition on result value of the calculation on the input value 'xt', result value of the calculation on the output value 'ht−1' and result value of the bias calculation. Then, the data storing device 200 may perform remaining operations such as activation function process and so forth.

The calculation on the input value 'xt' may indicate a calculation on the input value 'xt' (first input data described later) and a weight value (third input data described later) of the input value 'xt'. The calculation on the output value 'ht−1' may indicate a calculation on the output value 'ht−1' (second input data described later) and a weight value (fourth input data described later) of the output value 'ht−1'.

Referring to FIG. 3, when the input value 'xt' is required to obtain 'ft', 'it', 'ot' and 'gt', required data may be not 'ht' but 'ht−1', which is an output value of a previous cell. Therefore, it is impossible to perform calculations on 'xt' and 'ht' at the same time.

In an embodiment, calculation on the input value 'xt', calculation on the output value 'ht−1' and bias calculation may be separately performed, and then remaining operations including an activation function process may be performed.

Referring to FIG. 3, the data storing device 200 may obtain, in the LSTM of a structure where a plurality of individual cells are coupled with one another, a first calculation result value through calculations on the input value 'xt', which is an input value of a current cell, and weight values 'Wxh_f', 'Wxh_i', 'Wxh_o' and 'Wxh_g', which is are weight values of the input value 'xt' ("(1)" in FIG. 3).

Also, the data storing device 200 may obtain a second calculation result value through the output value 'ht−1', which is an output value of a previous cell, and the weight values 'Whh_f', 'Whh_i', 'Whh_o' and 'Whh_g', which are weight values of 'ht−1' ("(3)" in FIG. 3).

Further, the data storing device 200 may obtain a third calculation result value 'bh_f', 'bh_i', 'bh_o' and 'bh_g' through a bias calculation ("(2)" in FIG. 3).

Still further, the data storing device 200 may perform addition on the first calculation result value, the second calculation result value and the third calculation result value ("(4)" in FIG. 3).

After that, the data storing device 200 may perform remaining operations such as an activation function process based on a result of the addition operation to obtain the status value 'gt' of a new cell through the forget gate value 'ft', input gate value 'it', output gate value 'ot' and Hyperbolic Tangent (tan h) function. Eventually, the data storing device 200 may obtain a status value 'ct' of a current cell and an output value 'ht' of the current cell. In FIG. 3, "σ" may indicate an activation function and 'ct−1' may indicate a status value of a previous cell.

Figure 4:
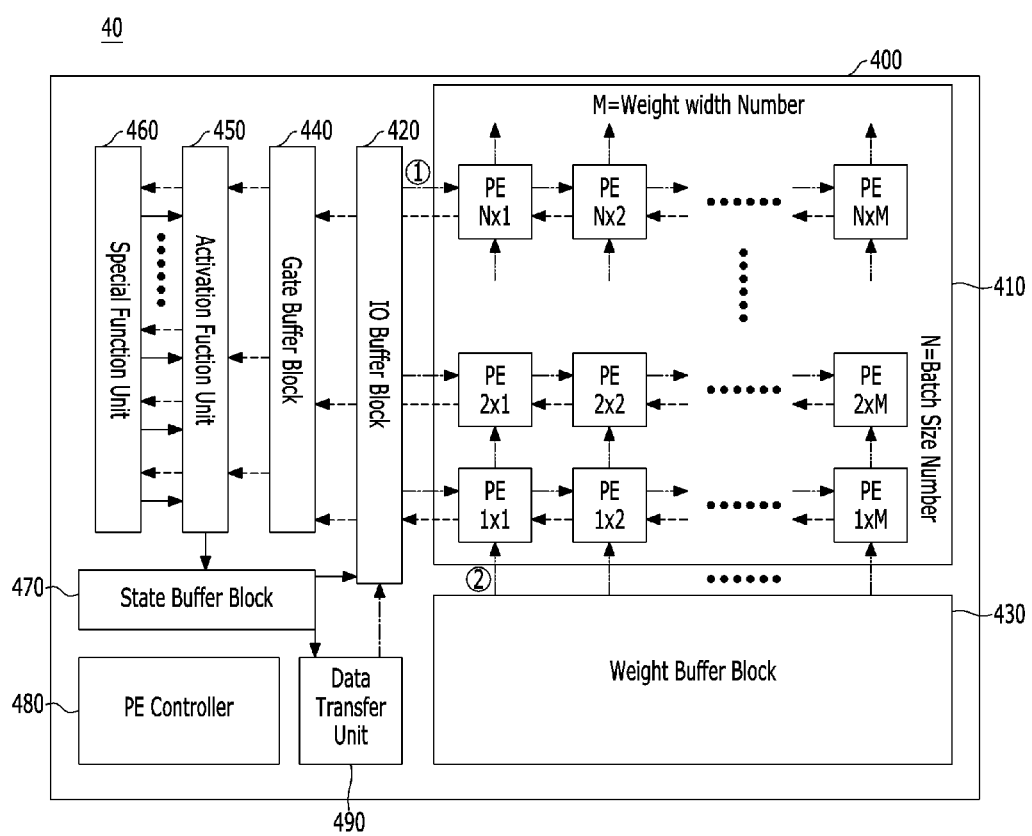
FIG. 4 is a diagram illustrating an example of an accelerating device based on some implementations of the disclosed technology.

FIG. 4 is a diagram illustrating a configuration of an accelerating device based on some implementations of the disclosed technology.

Figure 5:
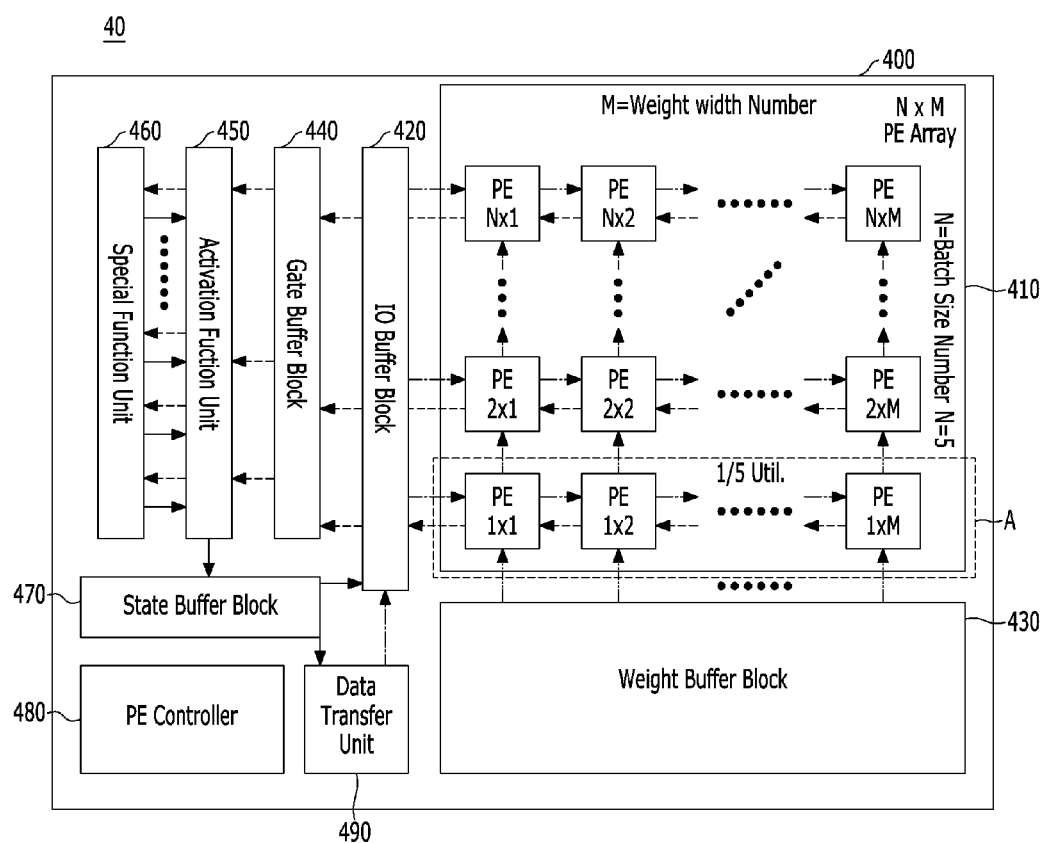
FIG. 5 is a diagram illustrating an example of a first calculation method based on some implementations of the disclosed technology.
Figure 6:
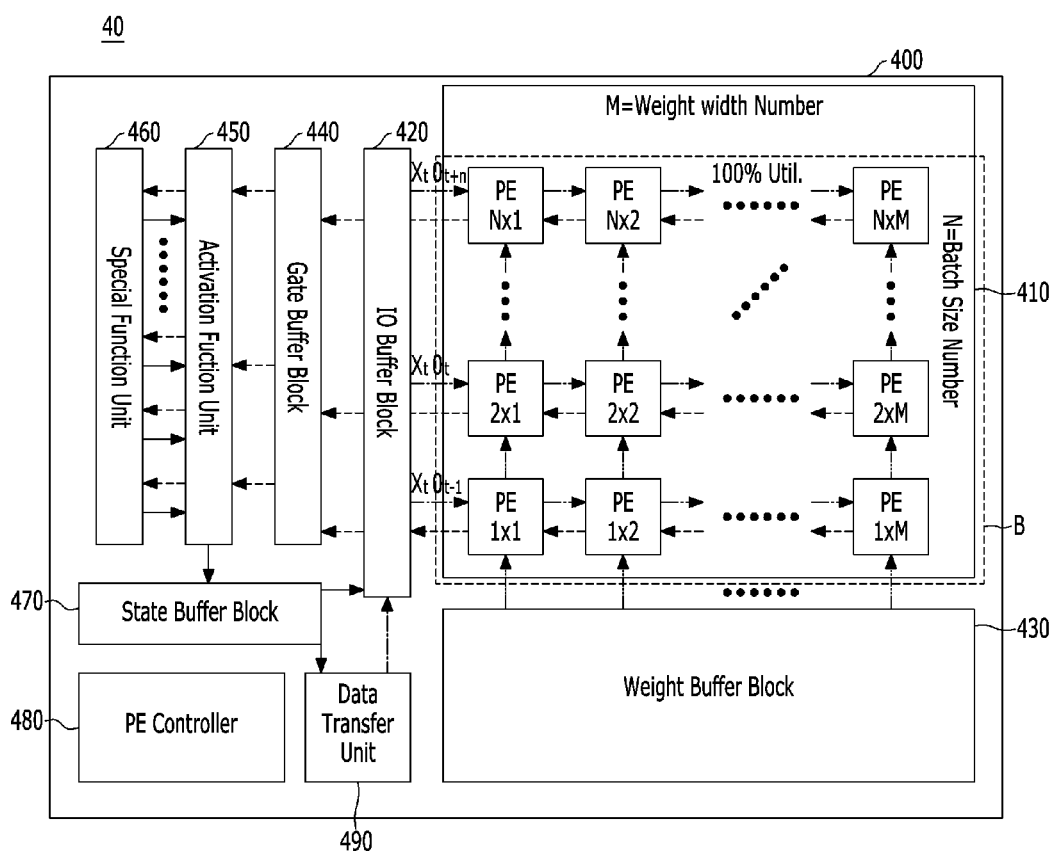
FIGS. 6 and 7 are diagrams illustrating an example of a second calculation method based on some implementations of the disclosed technology.
Figure 7:
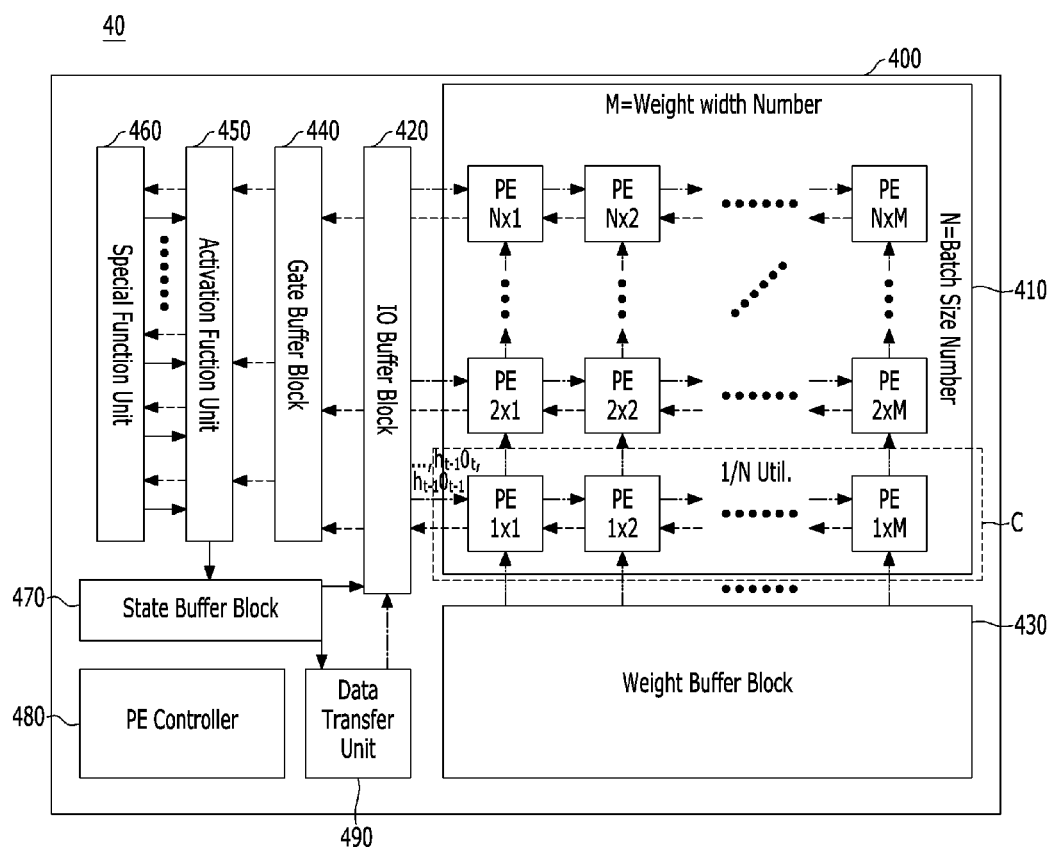

Hereinafter, a first calculation method based on some implementations of the disclosed technology will be described with reference to FIG. 5 illustrating an example of the first calculation method, and a second calculation method based on some implementations of the disclosed technology will be described with reference to FIGS. 6 and 7 illustrating an example of the second calculation method.

Referring to FIG. 4, the accelerating device 40 may include the accelerator 400 configured to process a calculation by determining a calculation method based on at least one or more between the batch size and the sequence size and by controlling an input path of first input data and second input data to a Processing Element (PE) Array 410 according to the determined calculation method.

The calculation method may include a first calculation method and a second calculation method. According to the first calculation method, the first input data and the second input data are input to the PE array 410 based on the batch size. According to the second calculation method, the first input data is input to the PE array 410 based on the sequence size.

For example, according to the first calculation method, a plurality of input data segments (e.g., 'xt') of the same sequence may be utilized as an input to the PE array 410 when there are a plurality of batches within a range that the PE array 410 can handle.

According to the second calculation method, 'x' number of input data 'xt−1', 'xt', 'xt+1' and so forth of different sequences may be utilized as inputs to the PE array 410. It may be possible to perform calculations by increasing parallelism as many as a number of the sequences of the 'x' number of input data. Since it is possible to utilize the weights of the 'x' number of input data to 'N' columns ("N" of FIG. 1), the utilization of MAC may also increase.

The accelerator 400 may include the PE array 410, an input/output IO buffer block 420, a weight buffer block 430, a gate buffer block 440, an activation function unit 450, a special function unit 460, a state buffer block 470, a PE controller 480 and a data transfer unit 490.

The PE array 410 may include a plurality of PEs.

The PE array 410 may output the first calculation result value, the second calculation result value and the third calculation result value. The first calculation result value may be a result of a calculation on a first input data and third input data, which is a weight value of the first input data. The second calculation result value may be a result of a calculation on a second input data and fourth input data, which is a weight value of the second input data.

The third calculation result value may indicate a result value of a bias calculation.

The PE array 410 may be of a systolic array. The PE array 410 may receive input data and a weight and may perform calculations of multiplying the input data and the weight and adding previously stored data.

The array structure of the PE array 410 may vary according to an area of an embodied system.

The IO buffer block 420 may provide the first input data and the second input data to the PE array 410 in a first direction (i.e., a direction of 1 in FIG. 4). The first input data may be input data of a current cell and may be 'xt' of FIG. 3. The second input data may be output data of a previous cell and may be the output value 'ht−1' of FIG. 3.

The IO buffer block 420 may receive the first calculation result value, the second calculation result value and the third calculation result value, which are provided from the PE array 410. The first calculation result value may be a result of a calculation on the first input data and the third input data, which is a weight value of the first input data. The second calculation result value may be a result of a calculation on the second input data and the fourth input data, which is a weight value of the second input data. The third calculation result value may indicate a result value of a bias calculation.

If data is provided directly from the PE array 410 to the gate buffer block 440, the transfer of the first calculation result value, the second calculation result value and the third calculation result value from the IO buffer block 420 to the gate buffer block 440 may be omitted.

The weight buffer block 430 may provide the third input data and the fourth input data to the PE array 410 in a second direction (i.e., a direction of 2 in FIG. 4). The third input data may be a weight value of the first input data. The fourth input data may be a weight value of the second input data.

The PE controller 480 may be configured to control overall operations of the accelerator 400 as well as an operation of determining one between the first calculation method and the second calculation method as the calculation method including a method of inputting the first input data and the second input data to the PE array 410 based on at least one or more among a result value of comparing the batch size with a batch reference value, a result value of comparing the sequence size with a sequence reference value and a combination of the result values.

According to the first calculation method, the first input data and the second input data may be input to the PE array 410 based on the batch size. According to the second calculation method, the first input data may be input to the PE array 410 based on the sequence size.

It may also be possible not for the accelerator 400 but for the host device 100 to determine one between the first calculation method and the second calculation method, which will be described later.

If the first calculation method is determined as the calculation method, the PE controller 480 may control the first input data or the second input data corresponding to the batch size, to be input to the PE array 410 in the first direction.

For example, referring to FIG. 5, if the batch size of input data is '1' and the sequence size of the input data is '5', the PE controller 480 may input the first input data to the PE array 410 through the IO buffer block 420. Here, the PE controller 480 may input the first input data 'xt0t−1', 'xt0t', 'xt0t+1', 'xt0t+2' and 'xt0t+3' by repeating a 1/N Util ("A" in FIG. 5) 5 times. In the notation 'xt0t−1', '0' represents a batch and 't−1' represent a sequence.

Also, when inputting the second input data (e.g., 'h0t−1') to the PE array 410 through the IO buffer block 420, the PE controller 480 may repeat the 1/N Util ("A" in FIG. 5) 5 times.

In an example of FIG. 5, when it takes '2t' of time for the accelerator 400 to perform a calculation for the first input data and the second input data once, it may take '10t' of time for the accelerator 400 to perform a calculation with the 1/N Util ("A" in FIG. 5). Here, '2t' of time may be '1t' for a calculation on 'xt' and '1t' for a calculation on 'ht−1'.

If the second calculation method is determined as the calculation method, the PE controller 480 may control the first input data corresponding to the sequence size, to be input to the PE array 410 in the first direction.

For example, referring to FIG. 6, if the batch size of input data is '1' and the sequence size of the input data is '10', the PE controller 480 may input, at a time, the first input data (e.g., 'xt0t−1', 'xt0t', xt0t+1', 'xt0t+2', 'xt0t+3', 'xt0t+4', 'xt0t+5', 'xt0t+6', 'xt0t+7' and 'xt0t+8') to the PE array 410 through the IO buffer block 420 in the first direction.

That is, the PE controller 480 may input, at a time, all the first input data corresponding to the sequence size of '10' to the PE array 410. Here, in the notations 'xt0t−1', 'xt0t', 'xt0t+1', 'xt0t+2', 'xt0t+3', 'xt0t+4', 'xt0t+5', 'xt0t+6', 'xt0t+7' and 'xt0t+8', 't−1', 't', 't+1,', 't+2', 't+3', 't+4', 't+5', 't+6', 't+7' and 't+8' may represent the sequences. The calculations may be performed by inputting the first input data of different sequences into the PE array 410. In an example of FIG. 6, "N" may be '10'. Since "N" is '10', 100% Util ("B" in FIG. 6) may be utilized.

Referring to FIG. 7, when inputting the second input data (e.g., ht−10t−1, ht−10t, . . . ) to the PE array 410 through the IO buffer block 420, the PE controller 480 may repeat the 1/N Util ("C" in FIG. 7) 10 times.

Referring to FIGS. 6 and 7, the 10/N Util is utilized once ('1t') for the calculation on 'xt' and 1/N Util is utilized 10 times ('10t') for the calculation on 'ht−1'. Therefore, the first input data and the calculation operation on the first input data may be completed in the PE array 410 within the '11t' amount of time in total.

Figure 8:
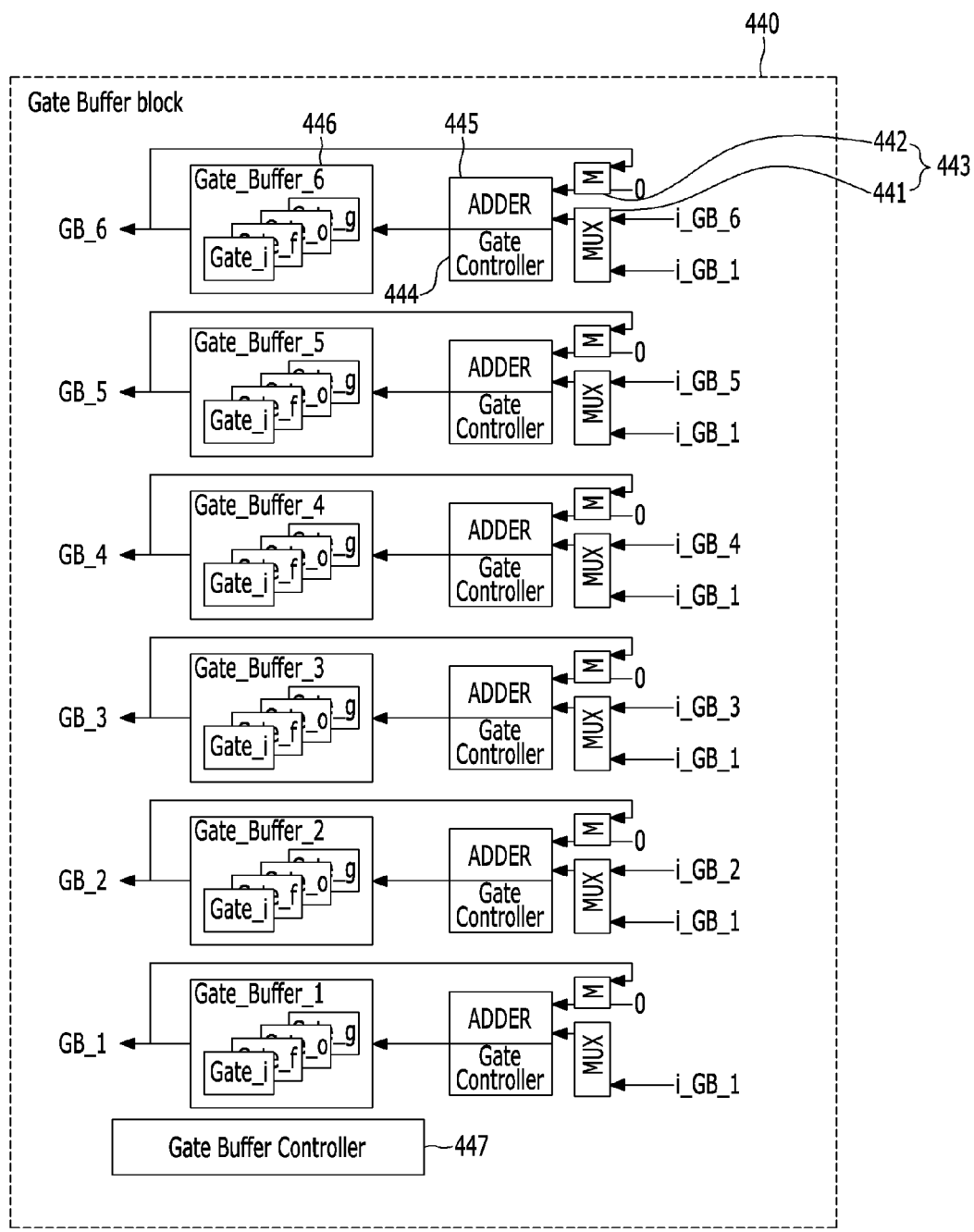
FIG. 8 is a diagram illustrating an example of a gate buffer block based on some implementations of the disclosed technology.

FIG. 8 is a diagram illustrating a configuration of a gate buffer block based on some implementations of the disclosed technology.

The gate buffer block 440 may perform an addition process on the first calculation result value, the second calculation result value and the third calculation result value, which are provided from the PE array 410, and may store related data. Here, it may also be possible for the data provided from the PE array 410 to be transferred through the IO buffer block 420. That is, the gate buffer block 440 may receive data, which is provided from the PE array 410, directly from the PE array 410 or through the IO buffer block 420.

Referring to FIG. 8, the gate buffer block 440 may include multiplexers (MUX) 443, gate controllers 444, adders 445, gate buffers 446 and a gate buffer controller 447.

The multiplexer 443 may be configured to process input of data as well as the first calculation result value, the second calculation result value and the third calculation result value. Here, the third calculation result value may be input together with or separately from the first calculation result value.

The multiplexer 443 may include a first multiplexer 441 and a second multiplexer 442. The first multiplexer 441 may selectively input, to the adder 445, at least one or more among the first calculation result value, the second calculation result value and the third calculation result value, which are provided from the PE array 410. The second multiplexer 442 may selectively input, to the adder 445, one between data of '0' and data fed-back from the gate buffer 446.

The gate controller 444 may be configured to control input of data.

The adder 445 may process an addition on the first calculation result value, the second calculation result value and the third calculation result value.

The gate buffer 446 may be configured to store at least one or more among the first calculation result value, the second calculation result value and the third calculation result value, which are provided from the PE array 410, and a result of the addition process on the first calculation result value, the second calculation result value and the third calculation result value.

As illustrated in FIG. 8, the gate buffer 446 may include a plurality of data storage regions (e.g., "Gate_i", "Gate_f", "Gate_o" and "Gate_g" in FIG. 8), and may separately store the calculation result values in the respective data storage regions under the control of the gate buffer controller 447. Here, it is obvious that the data storage regions will not be limited to the "Gate_i", "Gate_f", "Gate_o" and "Gate_g" but may be expanded or reduced depending on an operator.

The gate buffer controller 447 may be configured to control overall operations of the gate buffer block 440.

Figure 9:
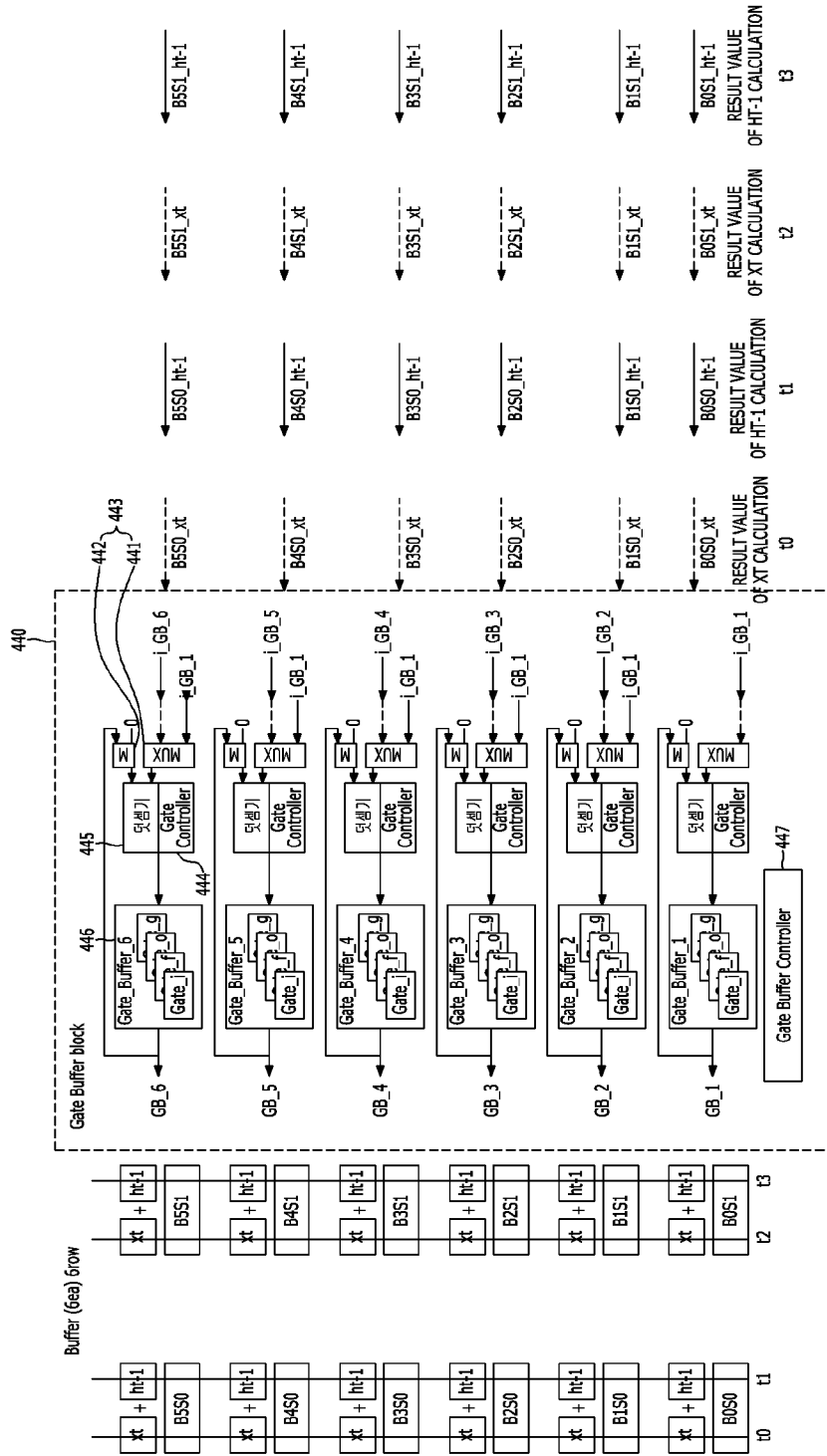
FIG. 9 illustrates an example operation of a gate buffer block based on some implementations of the disclosed technology.

FIG. 9 is a diagram illustrating an operation of a gate buffer block based on some implementations of the disclosed technology.

FIG. 9 illustrates the operation of the gate buffer block 440 when the input data is of the batch size of '6'. Hereinafter, described will be an example of the first calculation method applied to the PE array 410.

Referring to FIG. 9, the gate buffer controller 447 may receive, through the multiplexer 443, the first calculation result value in an order of the path 'i_GB_nn' (i.e., the path 'i_GB_1', the path 'i_GB_2', . . . , the path 'i_GB_6') and the second calculation result value in an order of the path 'i_GB_nn' (i.e., the path 'i_GB_1', the path 'i_GB_2', . . . , the path 'i_GB_6').

At a time point 't0', the gate buffer controller 447 may receive the first calculation result values 'B0S0_xt', 'B1S0_xt', 'B2S0_xt', 'B3S0_xt', 'B4S0_xt' and 'B5S0_xt' through the multiplexer 443. In the notation 'B0S0_xt', 'B' may represent batch identification and 'S' may represent sequence identification. That is, the first calculation result value 'B0S0_xt' may be of a batch 0 and a sequence 0.

At a time point 't1', the gate buffer controller 447 may receive the second calculation result values 'B0S0_ht−1', 'B1S0_ht−1', 'B2S0_ht−1', 'B3S0_ht−1', 'B4S0_ht−1' and 'B5S0_ht−1' through the multiplexer 443. After that, the gate buffer controller 447 may receive the first calculation result value and the second calculation result value in a similar way as described above.

Figure 10:
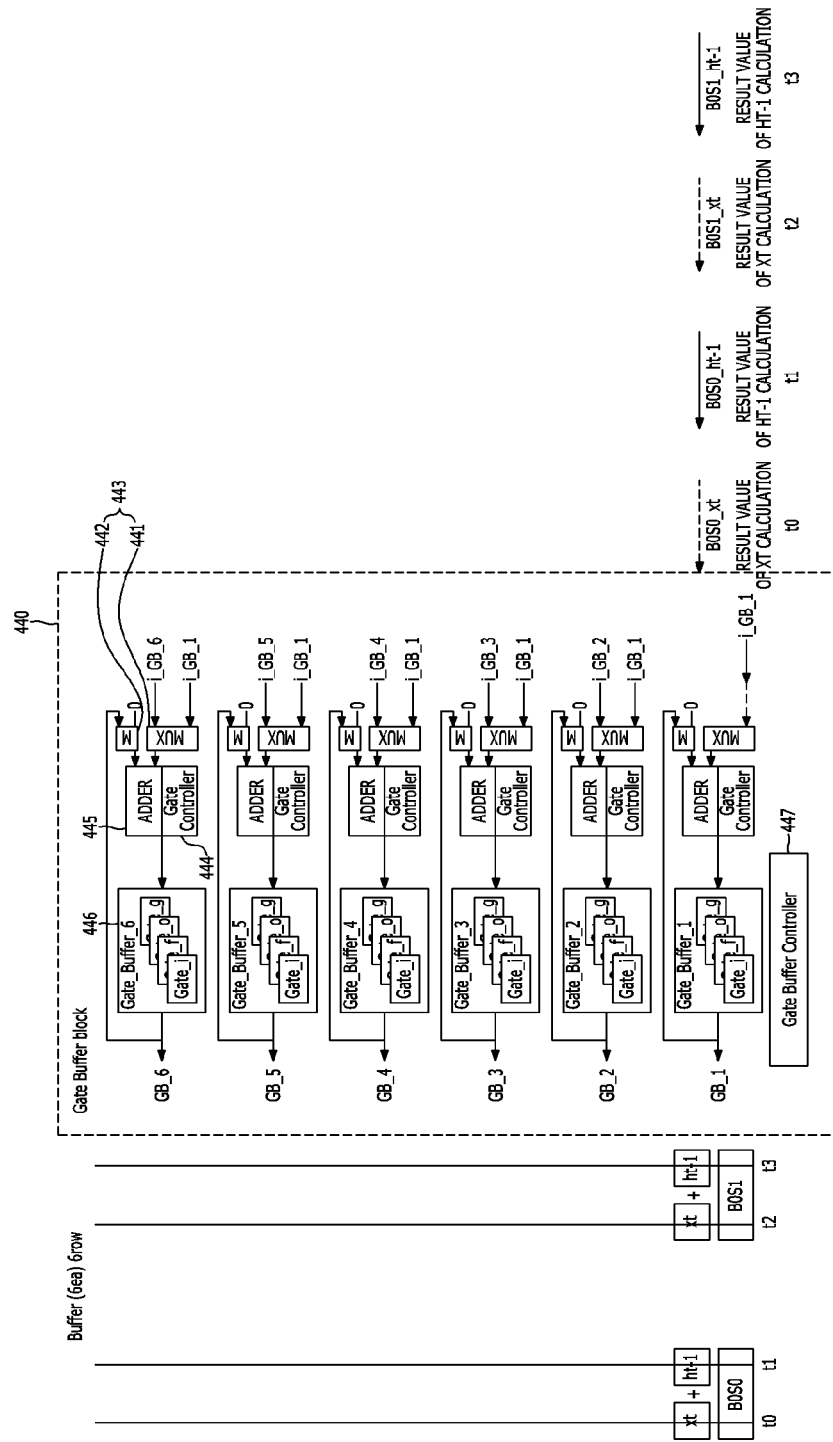
FIG. 10 illustrates an example operation of a gate buffer block based on some implementations of the disclosed technology.

FIG. 10 is a diagram illustrating an operation of a gate buffer block based on some implementations of the disclosed technology.

FIG. 10 illustrates the operation of the gate buffer block 440 when the input data is of the batch size of '1'. Hereinafter, described will be an example of the first calculation method applied to the PE array 410.

Referring to FIG. 10, the gate buffer controller 447 may receive, through the multiplexer 443, the first calculation result value by utilizing only the path 'i_GB_1' and the second calculation result value by utilizing only the path 'i_GB_1'.

At a time point 't0', the gate buffer controller 447 may receive the first calculation result value of only 'B0S0_xt' through the multiplexer 443. In the notation 'B0S0_xt', 'B' may represent batch identification and 'S' may represent sequence identification. That is, the first calculation result value 'B0S0_xt' may be of a batch 0 and a sequence 0.

At a time point 't1', the gate buffer controller 447 may receive the second calculation result value of only 'B0S0_ht−1' through the multiplexer 443. After that, the gate buffer controller 447 may receive the first calculation result value or the second calculation result value in a similar way as described above only through the path 'i_GB_1'. Depending on the sequence size of the input data, the gate buffer controller 447 may repeat the input process of the calculation result value by utilizing the path 'i_GB_1'.

Figure 11:
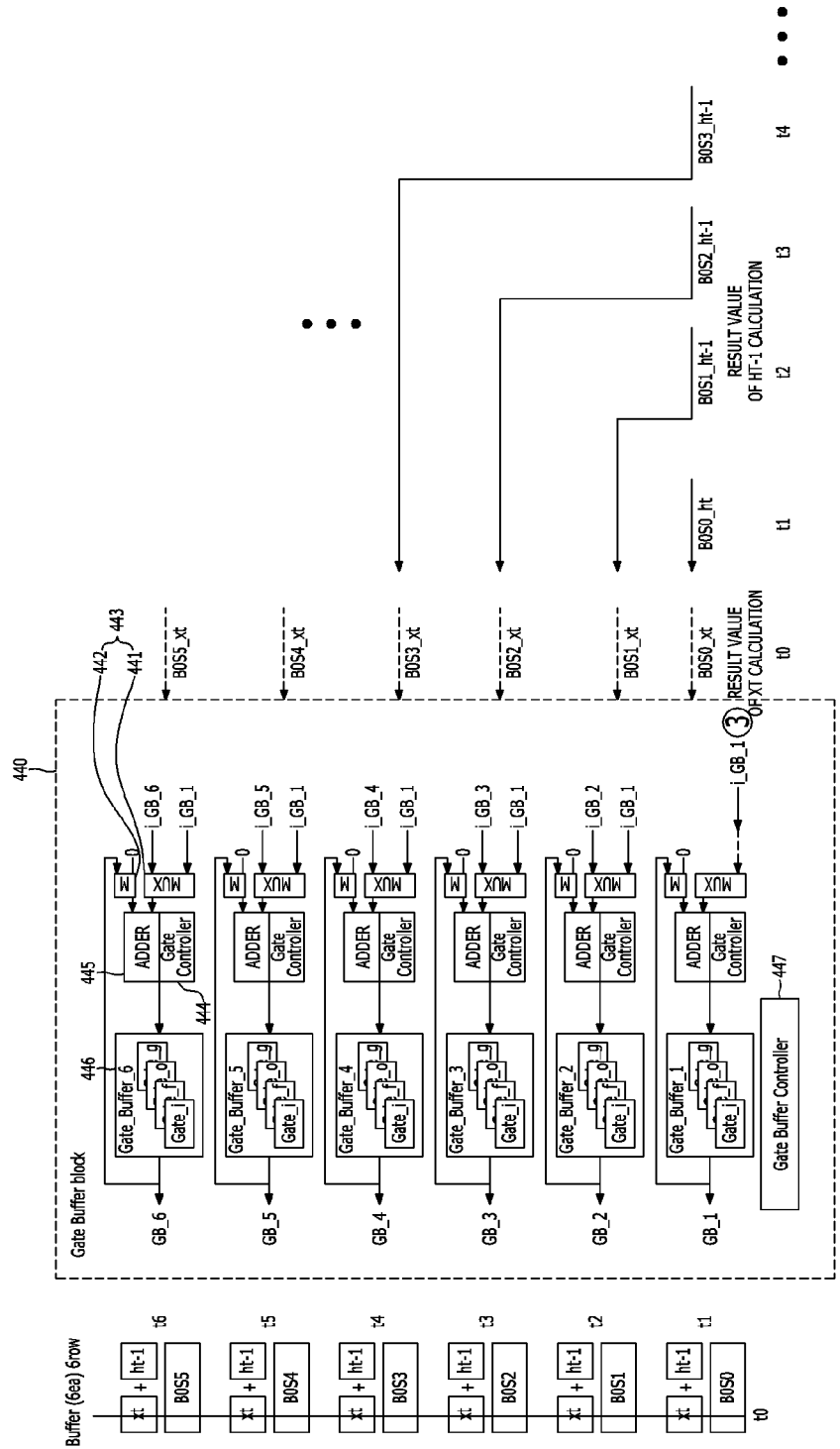
FIG. 11 is a diagram illustrating an example operation of a gate buffer block based on some implementations of the disclosed technology.

FIG. 11 is a diagram illustrating an operation of a gate buffer block based on some implementations of the disclosed technology.

FIG. 11 illustrates the operation of the gate buffer block 440 when the input data is of the batch size of '1' and the sequence size of '6'. Hereinafter, described will be an example of the second calculation method applied to the PE array 410.

Referring to FIG. 11, the gate buffer controller 447 may receive, through the multiplexer 443, the first calculation result value in an order of the path 'i_GB_nn' (i.e., the path 'i_GB_1', the path 'i_GB_2', . . . , the path 'i_GB_6').

At a time point 't0', the gate buffer controller 447 may receive the first calculation result values 'B0S0_xt', 'B0S1_xt', 'B0S2_xt', 'B0S3_xt', 'B0S4_xt' and 'B0S5_xt' through the multiplexer 443. In the notation 'B0S0_xt', 'B' may represent batch identification and 'S' may represent sequence identification. That is, the first calculation result value 'B0S0_xt' may be of a batch 0 and a sequence 0.

The gate buffer controller 447 may sequentially receive the second calculation result values through the multiplexer 443. The gate buffer controller 447 may receive the second calculation result value of a batch 0 and a sequence 0 through the path 'i_GB_1' ("③" in FIG. 11). The gate buffer controller 447 may receive the second calculation result value of a batch 0 and a sequence 1 through the path 'i_GB_2'. The gate buffer controller 447 may receive the second calculation result value of a batch 0 and a sequence 2 through the path 'i_GB_3'. The gate buffer controller 447 may receive the second calculation result value of a batch 0 and a sequence 3 through the path 'i_GB_4'. The gate buffer controller 447 may receive the second calculation result value of a batch 0 and a sequence 4 through the path 'i_GB_5'. The gate buffer controller 447 may receive the second calculation result value of a batch 0 and a sequence 5 through the path 'i_GB_6'.

At a time point 't1', the gate buffer controller 447 may receive the second calculation result value 'B0S0_ht−1' through the multiplexer 443. At a time point 't2', the gate buffer controller 447 may receive the second calculation result value 'B0S1_ht−1' through the multiplexer 443. At a time point 't3', the gate buffer controller 447 may receive the second calculation result value 'B0S2_ht−1' through the multiplexer 443. At a time point 't4', the gate buffer controller 447 may receive the second calculation result value 'B0S3_ht−1' through the multiplexer 443. At a time point 't5', the gate buffer controller 447 may receive the second calculation result value 'B0S4_ht−1' through the multiplexer 443. At a time point 't6', the gate buffer controller 447 may receive the second calculation result value 'B0S5_ht−1' through the multiplexer 443.

The gate buffer controller 447 may separately store the first calculation result value and the second calculation result value, which are provided through the multiplexer 443, in the gate buffers 446 according to corresponding sequences.

For example, the gate buffer controller 447 may separately store the first calculation result value and the second calculation result value in the respective gate buffers "Gate_Buffer 1", "Gate_Buffer 2", "Gate_Buffer 3", "Gate_Buffer 4", "Gate_Buffer 5" and "Gate_Buffer 6". It is obvious that the second calculation result values may also be separately stored.

Further, the gate buffer controller 447 may separately store the first to third calculation result values in the respective gate buffers "Gate_Buffer 1", "Gate_Buffer 2", "Gate_Buffer 3", "Gate_Buffer 4", "Gate_Buffer 5" and "Gate_Buffer 6". In each of the gate buffers "Gate_Buffer 1", "Gate_Buffer 2", "Gate_Buffer 3", "Gate_Buffer 4", "Gate_Buffer 5" and "Gate_Buffer 6", the gate buffer controller 447 may further separately store the first to third calculation result values in the respective data storage regions "Gate_i", "Gate_f", "Gate_o" and "Gate_g".

Referring back to FIG. 8, the gate buffer block 440 may include at least one or more sets of the multiplexer 443, the gate controller 444, the adder 445 and the gate buffer 446 and may include a plurality of the sets each including the multiplexer 443, the gate controller 444, the adder 445 and the gate buffer 446, a number of the sets being as many as the number (e.g., 'N') of PEs disposed in the second direction (i.e., the direction of "②" in FIG. 4) within the PE array 410.

The activation function unit 450 may be configured to perform an activation function process on the data obtained by performing the calculation and provided from the gate buffer block 440.

The special function unit 460 may be configured to perform a special calculation, which is other than the activation function process, on the data obtained by performing the activation function process to obtain a state value of a current cell and an output value of the current cell.

The state buffer block 470 may be configured to store the state value of a current cell and the output value of the current cell, which are provided from the activation function unit 450, and provide the state value of the current cell and the output value of the current cell.

The data transfer unit 490 may be coupled to each of the IO buffer block 420 and the state buffer block 470. The data transfer unit 490 may transfer the data, which is provided from the host device 100 (see FIG. 2), to the IO buffer block 420. The data transfer unit 490 may transfer the data, which is provided from the state buffer block 470, to the host device 100. That is, the PE controller 480 may provide and receive control signals to and from the host device 100 while the data transfer unit 490 may provide and receive data to and from the host device 100.

Figure 12:
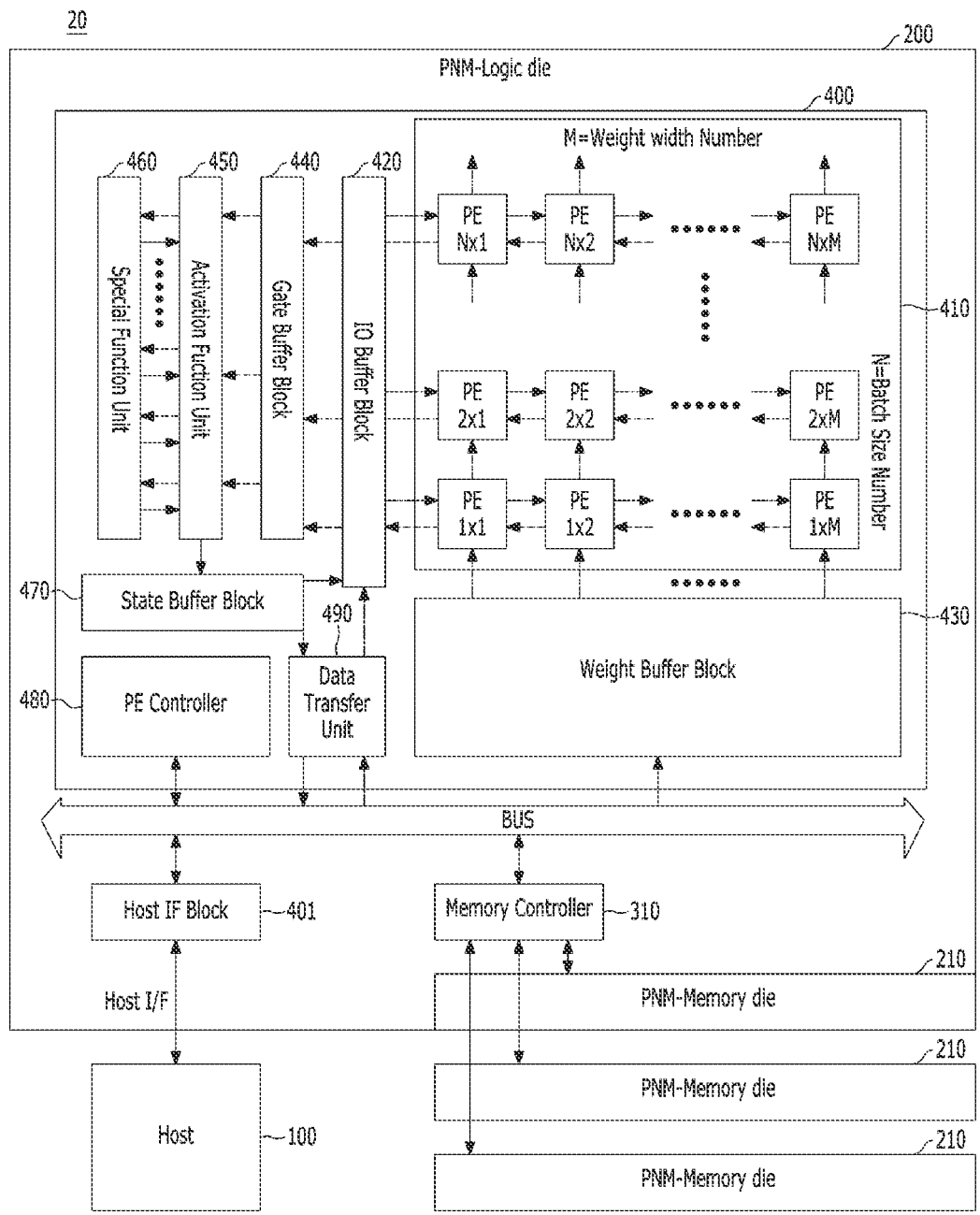
FIG. 12 is a diagram illustrating an example of a data processing system based on some implementations of the disclosed technology.

FIG. 12 is a diagram illustrating a configuration of a data processing system based on some implementations of the disclosed technology.

Referring to FIG. 12, the data processing system 20 may include a host device 100 and a data storing device 200.

The host device 100 may determine a calculation method as well as a method of inputting the first input data and the second input data to the PE (Processing Element) array 410 based on at least one or more among a result value of comparing the batch size with a batch reference value, a result value of comparing the sequence size with a sequence reference value and a combination of the result values.

Referring to FIG. 12, the data storing device 200 may include a host interface (IF) block 401, a memory controller 310, an accelerator 400 and a plurality of memory dies 210. Here, the memory controller 310 and the accelerator 400 may be included in the logic die 300 (see FIG. 2).

The host IF block 401 may be configured to perform communication between the accelerator 400 and the host device 100.

The host IF block 401 may serve as an interface between the host device 100 and the data storing device 200 according to a protocol of the host device 100. For example, the host IF block 401 may communicate with the host device 100 through the Serdes Interface protocol. Not limited thereto, the host IF block 401 may support any protocol capable of communicating with the host device 100 as well as protocols such as the peripheral component interconnect express (PCI-E), the universal serial bus (USB), the universal flash storage (UFS), the multimedia card (MMC), the parallel advanced technology attachment (PATA), the serial advanced technology attachment (SATA), the small computer system interface (SCSI), the serial attached SCSI (SAS) and the peripheral component interconnection (PCI).

The memory controller 310 may receive data from an external memory (e.g., the plurality of memory dies 210) to transfer the received data to the accelerator 400.

The data storing device 200, which will be described later, may receive the calculation method from the host device 100 and may determine by itself the calculation method by receiving the batch size and the sequence size from the host device 100.

In an embodiment, the data storing device 200 may include the accelerator 400 configured to control an input path of the first input data and the second input data to the PE array 410 according to the calculation method provided from the host device 100. The calculation method may include a first calculation method and a second calculation method. According to the first calculation method, the first input data and the second input data are input to the PE array 410 based on the batch size. According to the second calculation method, the first input data is input to the PE array 410 based on the sequence size.

In an embodiment, the data storing device 200 may include the accelerator 400 configured to determine the calculation method based on at least one or more between the batch size and the sequence size provided from the host device 100 and to control an input path of the first input data and the second input data to the PE array 410 according to the determined calculation method to process a calculation. The calculation method may include a first calculation method and a second calculation method. According to the first calculation method, the first input data and the second input data are input to the PE array 410 based on the batch size. According to the second calculation method, the first input data is input to the PE array 410 based on the sequence size.

The accelerator 400, which will be described hereinafter, may be applicable to the data storing device 200 in both the above described cases.

The accelerator 400 may include the PE array 410, an IO buffer block 420, a weight buffer block 430, a gate buffer block 440, an activation function unit 450, a special function unit 460, a state buffer block 470, a PE controller 480 and a data transfer unit 490.

The PE array 410 may include a plurality of PEs.

The IO buffer block 420 may provide the first input data and the second input data to the PE array 410 in a first direction.

Also, the IO buffer block 420 may receive the first calculation result value, the second calculation result value and the third calculation result value, which are provided from the PE array 410, to transfer the first calculation result value, the second calculation result value and the third calculation result value to the gate buffer block 440. The first calculation result value may be a result of a calculation on the first input data and the third input data, which is a weight value of the first input data. The second calculation result value may be a result of a calculation on the second input data and the fourth input data, which is a weight value of the second input data. The third calculation result value may indicate a result value of a bias calculation.

If data is provided directly from the PE array 410 to the gate buffer block 440, the transfer of the first calculation result value, the second calculation result value and the third calculation result value from the IO buffer block 420 to the gate buffer block 440 may be omitted.

The weight buffer block 430 may provide the third input data and the fourth input data to the PE array 410 in a second direction.

In an embodiment, the PE controller 480 may be configured to control overall operations of the accelerator 400 according to the calculation method provided from the host device 100.

In an embodiment, in the case where the data storing device 200 determines the calculation method by itself, the PE controller 480 may be configured to control overall operations of the accelerator 400 as well as an operation of determining one between the first calculation method and the second calculation method as the calculation method including a method of inputting the first input data and the second input data to the PE array 410 based on at least one or more among a result value of comparing the batch size with a batch reference value, a result value of comparing the sequence size with a sequence reference value and a combination of the result values.

When the first calculation method is determined as the calculation method, the PE controller 480 may control the first input data or the second input data corresponding to the batch size, to be input to the PE array 410 in the first direction.

If the second calculation method is determined as the calculation method, the PE controller 480 may control the first input data corresponding to the sequence size, to be input to the PE array 410 in the first direction.

The gate buffer block 440 may perform an addition process on the first calculation result value, the second calculation result value and the third calculation result value, which are provided from the PE array 410, and may store related data.

As described later, it may also be possible to implement the function of the gate buffer block 440 within the state buffer block 470. Not limited thereto, it may also be possible to implement the function of the gate buffer block 440 within the IO buffer block 420.

The activation function unit 450 may be configured to perform an activation function process on the data obtained by performing the calculation and provided from the gate buffer block 440.

The special function unit 460 may be configured to perform a special calculation, which is other than the activation function process, on the data obtained by performing the activation function process to obtain a state value of a current cell and an output value of the current cell.

The state buffer block 470 may be configured to store the state value of a current cell and the output value of the current cell, which are provided from the activation function unit 450, and provide the state value of the current cell and the output value of the current cell.

The data transfer unit 490 may be coupled to each of the IO buffer block 420 and the state buffer block 470. The data transfer unit 490 may transfer the data, which is provided from the host device 100, to the IO buffer block 420. The data transfer unit 490 may transfer the data, which is provided from the state buffer block 470, to the host device 100.

Figure 13:
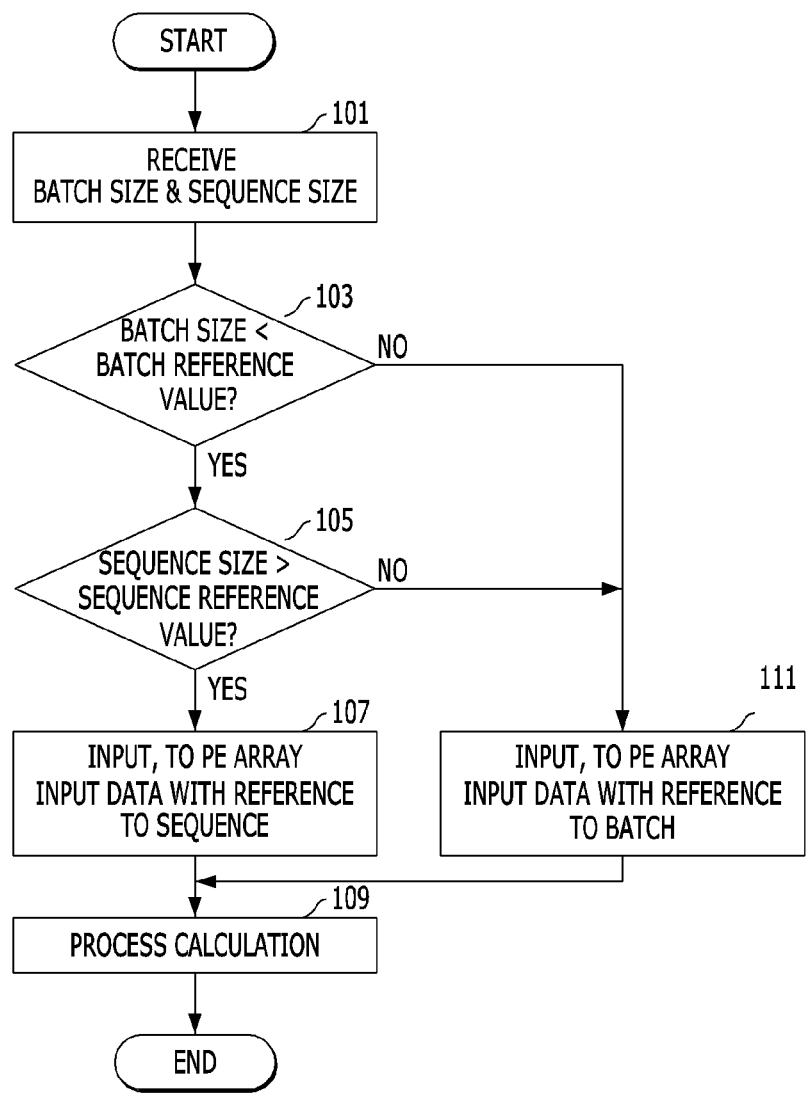
FIG. 13 is a flowchart illustrating an example operation of an accelerating device based on some implementations of the disclosed technology.

FIG. 13 is a flowchart illustrating an operation of an accelerating device based on some implementations of the disclosed technology.

The accelerating device 40 may receive the batch size and the sequence size (S101). Here, the batch size and the sequence size may be provided from the host device 100.

The accelerating device 40 may be configured to determine one between the first calculation method and the second calculation method as the calculation method including a method of inputting the first input data and the second input data to the PE array 410 based on at least one or more among a result value of comparing the batch size with a batch reference value, a result value of comparing the sequence size with a sequence reference value and a combination of the result values.

According to the first calculation method, the first input data and the second input data are input to the PE array 410 based on the batch size. According to the second calculation method, the first input data is input to the PE array 410 based on the sequence size.

The accelerating device 40 may determine whether the batch size is less than the batch reference value (S103). Here, the batch reference value may be equal to or less than a batch size that the PE array 410 can handle and may be arbitrarily determined by an operator.

If the batch size is determined as less than the batch reference value at step S103, the accelerating device 40 may determine whether the sequence size is greater than the sequence reference value (S105). Here, the sequence reference value may be equal to or less than a sequence size that the PE array 410 can handle and may be arbitrarily determined by an operator.

If the sequence size is determined as greater than the sequence reference value at step S105, the accelerating device 40 may determine the second calculation method as the calculation method and may input the first input data corresponding to the sequence size, to the PE array 410 in the first direction (S107). Here, the accelerating device 40 may also input the second input data not corresponding to the sequence size but corresponding to the batch size, to the PE array 410 in the first direction.

The accelerating device 40 may perform a calculation process by utilizing the first input data and the second input data and the weights respectively for the first input data and the second input data and then may obtain the state value of a current cell and the output value of the current cell (S109).

If the batch size is determined as equal to or greater than the batch reference value at step S103, the accelerating device 40 may determine the first calculation method as the calculation method and may input the first input data or the second input data corresponding to the batch size, to the PE array 410 in the first direction (S111).

Then, the accelerating device 40 may perform step S109.

Figure 14:
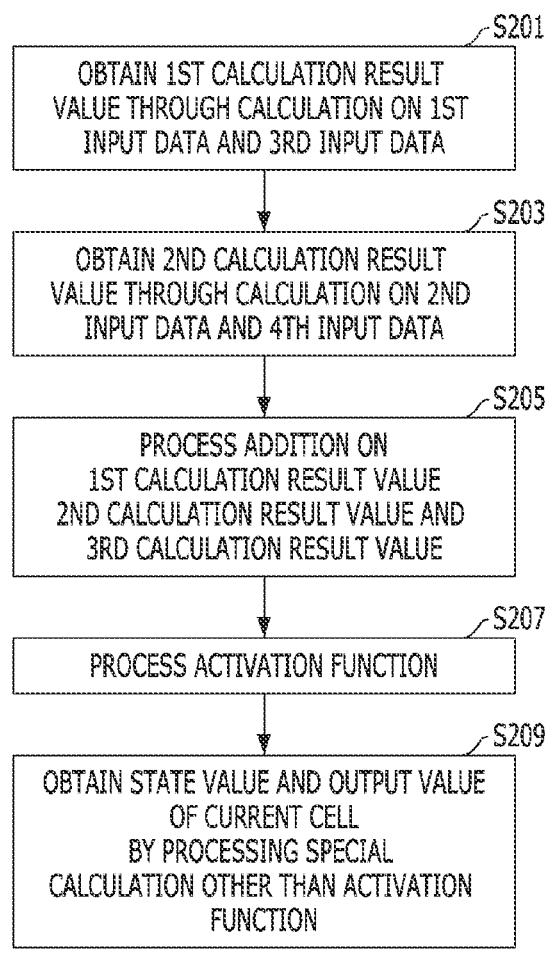
FIG. 14 is a flowchart illustrating in detail a part of the operation of the accelerating device illustrated in FIG. 13.

FIG. 14 is a flowchart illustrating in detail a part of the operation of the accelerating device illustrated in FIG. 13. FIG. 14 illustrates step S109 in detail.

The accelerating device 40 may perform a calculation on the first input data and the third input data, which is the weight value of the first input data, to obtain the first calculation result value (S201).

The accelerating device 40 may perform a calculation on the second input data and the fourth input data, which is the weight value of the second input data, to obtain the second calculation result value (S203).

The accelerating device 40 may perform an addition process on the first calculation result value, the second calculation result value and the third calculation result value, which is a result value of a bias calculation (S205).

Based on some implementations of the disclosed technology, the calculations may be separately performed on the first input data, the second input data and the bias value to obtain the first calculation result value, the second calculation result value and the third calculation result value and then a special calculation such as addition may be performed on the first calculation result value, the second calculation result value and the third calculation result value. Therefore, the parallel calculation may be possible within the PE array 410 and expected may be an effect that a speed of a calculation on data within the accelerating device 40 may be improved.

The accelerating device 40 may perform an activation function process on the result values, which is obtained by performing the addition (S207).

The accelerating device 40 may perform a special calculation, which is other than the activation function process, on the data obtained by performing the activation function process to obtain a state value (e.g., 'ct' of FIG. 3) of a current cell and an output value (e.g., 'ht' of FIG. 3) of the current cell (S209).

Figure 15:
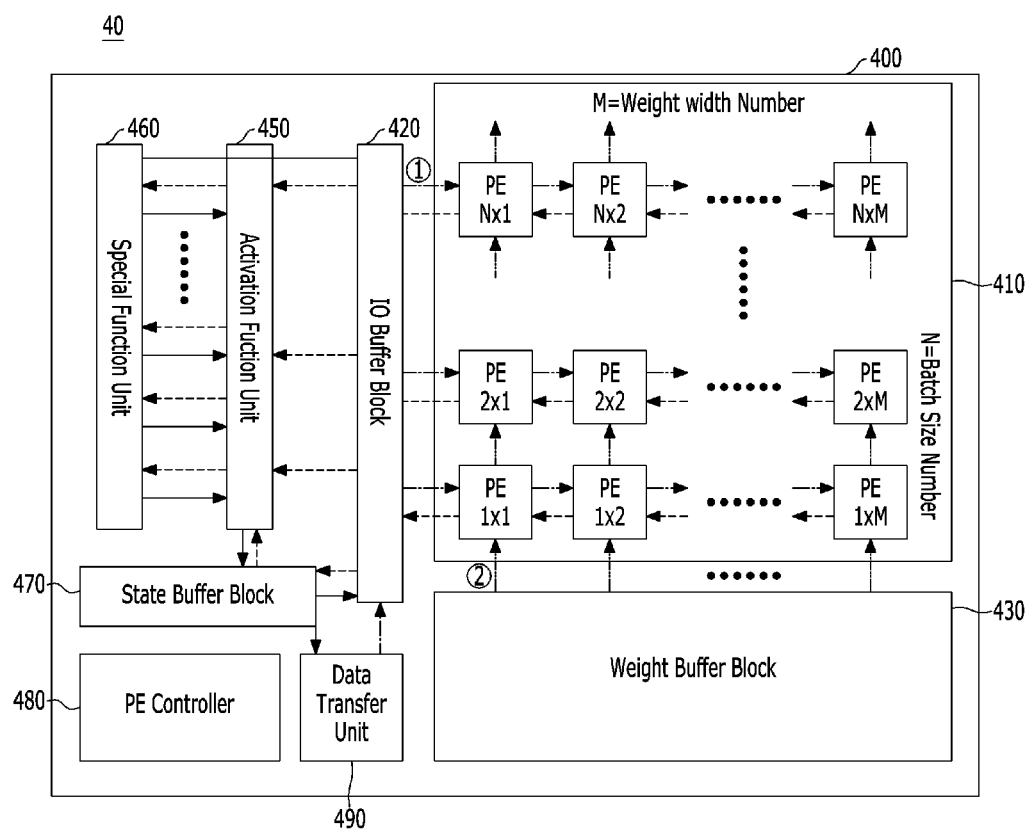
FIG. 15 is a diagram illustrating an example of an accelerating device based on some implementations of the disclosed technology.
Figure 16:
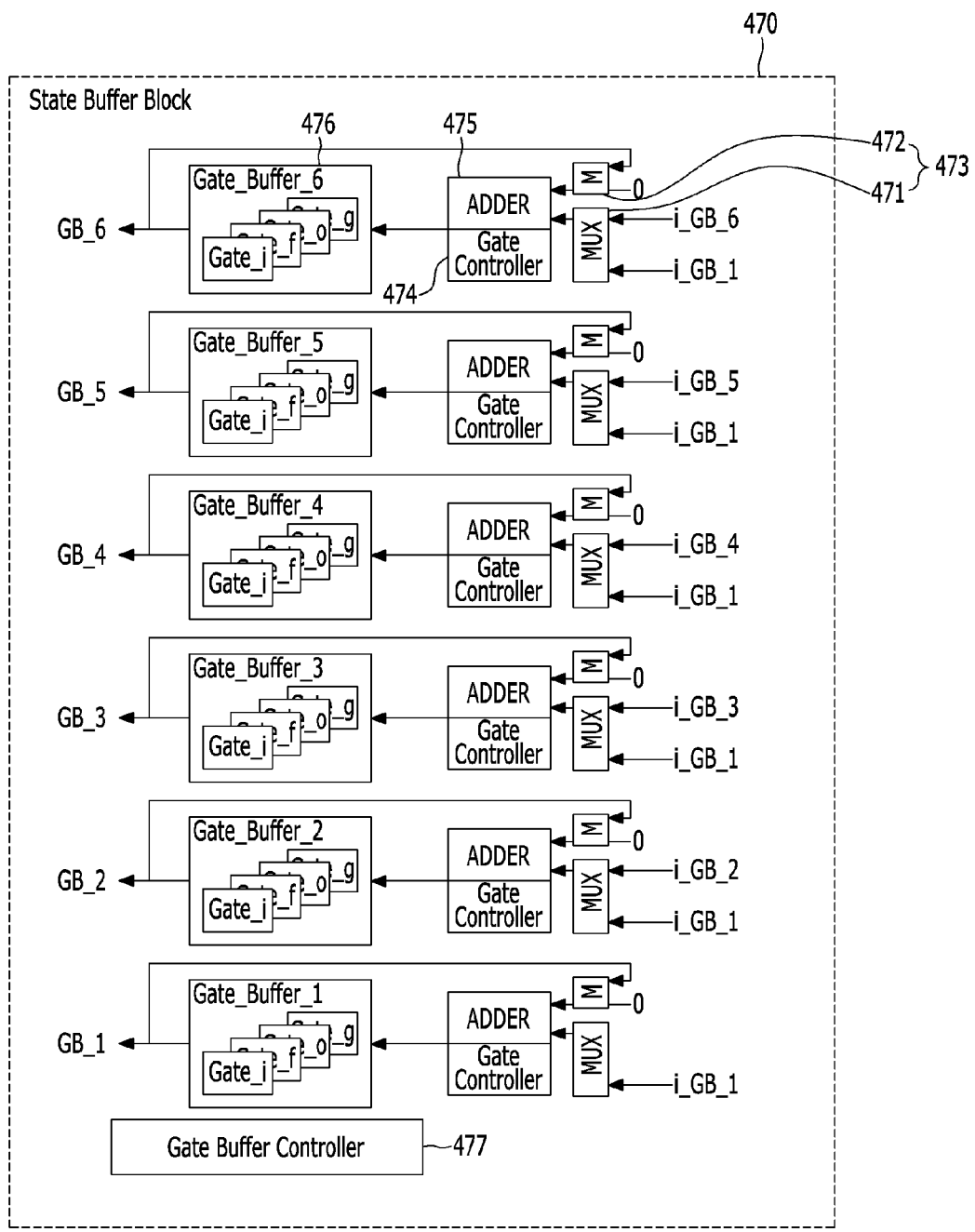
FIG. 16 is a diagram illustrating in detail a configuration of a state buffer block illustrated in FIG. 15.

FIG. 15 is a diagram illustrating a configuration of an accelerating device based on some implementations of the disclosed technology. FIG. 16 is a diagram illustrating in detail a configuration of a state buffer block illustrated in FIG. 15.

Hereinafter, described will be an example that the state buffer block 470 performs the addition process on the first calculation result value, the second calculation result value and the third calculation result value and stores data.

Referring to FIG. 15, the accelerating device 40 may include the accelerator 400 configured to process a calculation by determining a calculation method based on at least one or more between the batch size and the sequence size and by controlling an input path of the first input data and the second input data to the PE Array 410 according to the determined calculation method.

The calculation method may include a first calculation method and a second calculation method. According to the first calculation method, the first input data and the second input data are input to the PE array 410 based on the batch size. According to the second calculation method, the first input data is input to the PE array 410 based on the sequence size.

The accelerator 400 may include the PE array 410, an IO buffer block 420, a weight buffer block 430, an activation function unit 450, a special function unit 460, a state buffer block 470, a PE controller 480 and a data transfer unit 490.

The PE array 410 may include a plurality of PEs.

The IO buffer block 420 may provide the first input data and the second input data to the PE array 410 in a first direction.

The IO buffer block 420 may receive the first calculation result value, the second calculation result value and the third calculation result value, which are provided from the PE array 410, to transfer the first calculation result value, the second calculation result value and the third calculation result value to the gate buffer block 440. The first calculation result value may be a result of a calculation on the first input data and the third input data, which is a weight value of the first input data. The second calculation result value may be a result of a calculation on the second input data and the fourth input data, which is a weight value of the second input data.

If data is provided directly from the PE array 410 to the gate buffer block 440, the transfer of the first calculation result value, the second calculation result value and the third calculation result value from the IO buffer block 420 to the gate buffer block 440 may be omitted.

The weight buffer block 430 may provide the third input data and the fourth input data to the PE array 410 in a second direction.

The PE controller 480 may be configured to control overall operations as well as an operation of determining one between the first calculation method and the second calculation method as the calculation method including a method of inputting the first input data and the second input data to the PE array 410 based on at least one or more among a result value of comparing the batch size with a batch reference value, a result value of comparing the sequence size with a sequence reference value and a combination of the result values.

According to the first calculation method, the first input data and the second input data may be input to the PE array 410 based on the batch size. According to the second calculation method, the first input data may be input to the PE array 410 based on the sequence size.

If the first calculation method is determined as the calculation method, the PE controller 480 may control the first input data or the second input data corresponding to the batch size, to be input to the PE array 410 in the first direction (i.e., a direction of "①" in FIG. 15).

If the second calculation method is determined as the calculation method, the PE controller 480 may control the first input data corresponding to the sequence size, to be input to the PE array 410 in the first direction.

The state buffer block 470 may perform an addition process on the first calculation result value, the second calculation result value and the third calculation result value, which are provided from the PE array 410, and may store related data.

The state buffer block 470 may receive the first calculation result value, the second calculation result value and the third calculation result value through the IO buffer block 420 or the special function unit 460. In this case, the IO buffer block 420 or the special function unit 460 may receive the first calculation result value, the second calculation result value and the third calculation result value, which are provided from the PE array 410, to transfer the first calculation result value, the second calculation result value and the third calculation result value to the state buffer block 470.

The state buffer block 470 may store data (e.g., a state value (e.g., 'ct' of FIG. 3) of a current cell and an output value (e.g., 'ht' of FIG. 3) of the current cell), which are provided from the activation function unit 450, and provide the data (e.g., the state value (e.g., 'ct' of FIG. 3) of the current cell and the output value (e.g., 'ht' of FIG. 3) of the current cell). Referring to FIG. 16, the state buffer block 470 may include multiplexers (MUX) 473, gate controllers 474, adders 475, gate buffers 476 and a gate buffer controller 477.

The multiplexer 473 may be configured to process input of data as well as the first calculation result value, the second calculation result value and the third calculation result value.

The multiplexer 473 may include a first multiplexer 471 and a second multiplexer 472. The first multiplexer 471 may selectively input, to the adder 475, at least one or more among the first calculation result value, the second calculation result value and the third calculation result value, which are provided from the PE array 410. The second multiplexer 472 may selectively input, to the adder 475, one between data of '0' and data fed-back from the gate buffer 476.

The gate controller 474 may be configured to control input of data. That is, the gate controller 474 may be configured to control the input of data as well as the first calculation result value, the second calculation result value and the third calculation result value at the multiplexer 473.

The gate buffer 476 may be configured to store at least one or more among the first calculation result value, the second calculation result value and the third calculation result value, which are provided from the PE array 410, and a result of the addition process on the first calculation result value, the second calculation result value and the third calculation result value.

Also, the gate buffer 476 may store the state value (e.g., 'ct' of FIG. 3) of a current cell and an output value (e.g., 'ht' of FIG. 3) of the current cell.

The adder 475 may process an addition on the first calculation result value, the second calculation result value and the third calculation result value.

The gate buffer controller 477 may be configured to control overall operations of the state buffer block 470.

The gate buffer controller 477 may separately store the first calculation result value and the second calculation result value, which are provided through the multiplexer 473, in the gate buffers 476 according to corresponding sequences.

Although not illustrated, it may be possible for the third calculation result value to be input separately from the first calculation result value and the second calculation result value through the multiplexer 473 and it may be possible for the third calculation result value to be input together with the first calculation result value through the multiplexer 473. The gate buffer controller 477 may separately store the third calculation result value in the gate buffers 476.

The state buffer block 470 may include at least one or more sets of the multiplexer 473, the gate controller 474, the adder 475 and the gate buffer 476 and may include a plurality of the sets each including the multiplexer 473, the gate controller 474, the adder 475 and the gate buffer 476, a number of the sets being as many as the number of PEs disposed in the second direction (i.e., the direction of "②" in FIG. 15) within the PE array 410.

The state buffer block 470 may be configured to store the state value of a current cell and the output value of the current cell, which are provided from the activation function unit 450, and provide the state value of the current cell and the output value of the current cell.

The activation function unit 450 may be configured to perform an activation function process on the data obtained by performing the calculation and provided from the state buffer block 470.

The special function unit 460 may be configured to perform a special calculation, which is other than the activation function process, on the data obtained by performing the activation function process to obtain a state value of a current cell and an output value of the current cell.

The data transfer unit 490 may be coupled to each of the IO buffer block 420 and the state buffer block 470. The data transfer unit 490 may transfer the data, which is provided from the host device 100 (see FIG. 2), to the IO buffer block 420. The data transfer unit 490 may transfer the data, which is provided from the state buffer block 470, to the host device 100.

While certain embodiments have been described above as examples only. Accordingly, the accelerating device, data storing device, data processing system and operating method of accelerating device should not be limited based on the described embodiments. Rather, variations, modifications or enhancements of the disclosed embodiments and other embodiments of the accelerating device, data storing device, data processing system and operating method of accelerating device can be made based on what is disclosed in this patent document.

What is claimed is:

1. An accelerating device comprising:
a processing element array configured to output calculation result values for input data;
a processing element controller configured to determine a calculation method based on at least one of a batch size corresponding to a number of data concurrently processable by the processing element array or a sequence size corresponding to a length of data sequentially input to the processing element array and control an input path of the input data to the processing element array according to the calculation method; and
a gate buffer block including:
a multiplexer configured to selectively output values including the calculation result values provided from the processing element array, the calculation result values including a first calculation result value, a second calculation result value, and a third calculation result value, the first calculation result value being a result of a calculation on first input data and third input data corresponding to a weight value of the first input data, the second calculation result value being a result of a calculation on second input data and fourth input data corresponding to a weight value of the second input data, and the third calculation result value being a result value of a bias calculation;
an adder configured to perform an addition process on values output from the multiplexer; and
a gate buffer configured to store values output from the adder, the values output from the adder including at least one of the first calculation result value, the second calculation result value, or the third calculation result value, and a result of the addition process on the first calculation result value, the second calculation result value, and the third calculation result value,
wherein the input data is input to the processing element array based on the batch size upon determination that the calculation method is a first calculation method and the input data is input to the processing element array based on the sequence size upon determination that the calculation method is a second calculation method.

2. The accelerating device of claim 1, further including:
an input/output (IO) buffer block configured to provide the first input data and the second input data to the processing element array in a first direction; and
a weight buffer block configured to provide the third input data and the fourth input data to the processing element array in a second direction.

3. The accelerating device of claim 2,
wherein, upon determination that the calculation method is the first calculation method, the processing element controller is configured to control the first input data or the second input data corresponding to the batch size, to be input to the processing element array in the first direction, and
wherein, upon determination that the calculation method is the second calculation method, the processing element controller is configured to control the first input data corresponding to the sequence size, to be input to the processing element array in the first direction.

4. The accelerating device of claim 2, wherein the gate buffer block further includes a gate controller configured to control the multiplexer.

5. The accelerating device of claim 1, wherein the multiplexer includes:
a first multiplexer configured to selectively output, to the adder, at least one or more among the first calculation result value, the second calculation result value and the third calculation result value, which are provided from the processing element array; and
a second multiplexer configured to selectively output, to the adder, zero or data fed-back from the gate buffer.

6. The accelerating device of claim 4, wherein the processing element array includes a plurality of processing elements, and
wherein the gate buffer block includes at least one set, each set including the multiplexer, the gate controller, the adder and the gate buffer, and wherein a number of the at least one set corresponds to a number of processing elements in the second direction within the processing element array.

7. The accelerating device of claim 1, wherein the gate buffer block further includes a gate buffer controller configured to separately store the first calculation result value and the second calculation result value, which are provided through the multiplexer, in the gate buffer.

8. The accelerating device of claim 2, further including:
an activation function unit configured to perform an activation function process on data provided from the gate buffer block; and
a special function unit configured to perform a special calculation other than the activation function process, on data obtained by performing the activation function process to obtain a state value of a current cell and an output value of the current cell.

9. The device of claim 8, further including:
a state buffer block configured to store the state value of the current cell and the output value of the current cell, which are provided from the activation function unit, and provide the state value of the current cell and the output value of the current cell; and
a data transfer unit coupled to each of the IO buffer block and the state buffer block and configured to transfer data provided from a host device to the IO buffer block or transfer data provided from the state buffer block to the host device.

10. The accelerating device of claim 1, wherein the processing element controller determines the first calculation method as the calculation method when the batch size is equal to or greater than a batch reference value or the sequence size is equal to or less than a sequence reference value and determines the second calculation method as the calculation method when the batch size is less than the batch reference value and the sequence size is greater than the sequence reference value.

11. A data processing system comprising:
an accelerator including a processing element array configured to output calculation result values for input data; and
a host device configured to determine a calculation method based on at least one of a comparison between a batch size and a batch reference value, and a comparison between a sequence size and a sequence reference value, the batch size corresponding to a number of data concurrently processable by the processing element array and the sequence size corresponding to a length of data sequentially input to the processing element array,
wherein the accelerator further include:
gate buffer block including:
a multiplexer configured to selectively output values including the calculation result values provided from the processing element array; and
an adder configured to perform an addition process on values output from the multiplexer,
an activation function unit configured to perform an activation function process on data provided from the gate buffer block; and
a special function unit configured to perform a special calculation other than the activation function process, on data obtained by performing the activation function process to obtain a state value of a current cell and an output value of the current cell,
wherein the input data is input to the processing element array based on the batch size upon determination that the calculation method is a first calculation method and the input data is input to the processing element array based on the sequence size upon determination that the calculation method is a second calculation method.

12. The data processing system of claim 11,
wherein the include a first calculation result value, a second calculation result value and a third calculation result value, the first calculation result value being a result of a calculation on a first input data and third input data corresponding to a weight value of the first input data, and the second calculation result value being a result of a calculation on a second input data and fourth input data corresponding to a weight value of the second input data, and
wherein the accelerator further includes:
an input/output (IO) buffer block configured to provide the first input data and the second input data to the processing element array in a first direction;
a weight buffer block configured to provide the third input data and the fourth input data to the processing element array in a second direction; and
a processing element controller configured to control operations of the accelerator according to the calculation method determined by the host device.

13. The data processing system of claim 12,
wherein, upon determination that the calculation method is the first calculation method, the processing element controller is configured to control the first input data or the second input data corresponding to the batch size, to be input to the processing element array in the first direction, and
wherein, upon determination that the calculation method is the second calculation method, the processing element controller is configured to control the first input data corresponding to the sequence size, to be input to the processing element array in the first direction.

14. The data processing system of claim 12, wherein the third calculation result value is a result value of a bias calculation.

15. The data processing system of claim 12, wherein the accelerator further includes:
a state buffer block configured to store the state value of the current cell and the output value of the current cell, which are provided from the activation function unit, and provide the state value of the current cell and the output value of the current cell; and
a data transfer unit coupled to each of the IO buffer block and the state buffer block and configured to transfer data provided from the host device to the IO buffer block or transfer data provided from the state buffer block to the host device.

16. An operating method of an accelerating device, the operating method comprising:
- receiving a batch size corresponding to a number of data concurrently processable and a sequence size corresponding to a length of data sequentially input;
- selecting one between a first calculation method and a second calculation method as a calculation method based on at least one of a comparison between the batch size and a batch reference value and a comparison between the sequence size and a sequence reference value;
- inputting, upon determination that the calculation method is the first calculation method, input data corresponding to the batch size, to a processing element array in a first direction, or
- inputting, upon determination that the calculation method is the second calculation method, the input data corresponding to the sequence size, to the processing element array in the first direction;
- performing a calculation process by utilizing the input data and weight values and then outputting calculation result values;
- selectively outputting, by a multiplexer, values including the calculation result values provided from the processing element array;
- performing an addition process on values output from the multiplexer;
- performing an activation function process on data obtained by performing the addition process; and
- performing a special calculation other than the activation function process, on data obtained by performing the activation function process to obtain a state value of a current cell and an output value of the current cell.

* * * * *